United States Patent [19]
Konishi et al.

[11] Patent Number: 5,193,066
[45] Date of Patent: Mar. 9, 1993

[54] EQUIPMENT FOR ADJUSTING THE SHAPE OF A RUNNING BAND-LIKE OR PLATE-LIKE METAL MATERIAL IN THE WIDTH DIRECTION

[75] Inventors: Masami Konishi, Kobe; Hiroshi Narazaki, Amagasaki; Toshiharu Iwatani, Kobe; Kazuo Nose, Kobe; Takashi Sato, Kobe; Hiroo Oshima, Kobe; Soichi Kitagawa, Kobe; Hazime Tubono, Itami, all of Japan

[73] Assignee: Kabushiki Kaisha Kobe Seiko Sho, Kobe, Japan

[21] Appl. No.: 493,471

[22] Filed: Mar. 14, 1990

[30] Foreign Application Priority Data

| Mar. 14, 1989 | [JP] | Japan | 1-62654 |
| Mar. 14, 1989 | [JP] | Japan | 1-62657 |
| Mar. 14, 1989 | [JP] | Japan | 1-62658 |
| May 2, 1989 | [JP] | Japan | 1-113171 |
| Sep. 29, 1989 | [JP] | Japan | 1-256666 |
| Mar. 9, 1990 | [JP] | Japan | 2-58819 |
| Mar. 13, 1990 | [JP] | Japan | 2-62219 |
| Mar. 13, 1990 | [JP] | Japan | 2-62220 |
| Mar. 13, 1990 | [JP] | Japan | 2-62221 |
| Mar. 13, 1990 | [JP] | Japan | 2-62222 |

[51] Int. Cl.$^5$ .................. G06F 15/46; B21B 37/00
[52] U.S. Cl. ........................ 364/472; 72/11; 72/16; 395/903
[58] Field of Search .............. 364/472, 140, 141, 513, 364/148; 72/7, 8, 9, 11, 16; 395/50, 51, 60, 62, 903

[56] References Cited

U.S. PATENT DOCUMENTS

| 3,574,280 | 4/1971 | Smith, Jr. | 364/472 X |
| 3,781,117 | 12/1973 | Lavcak et al. | 250/563 X |
| 4,137,741 | 2/1979 | Fapiano et al. | 364/472 X |
| 4,269,051 | 5/1981 | Clarke et al. | 364/472 X |
| 4,562,529 | 12/1985 | Drummond | 364/141 X |
| 4,628,435 | 12/1986 | Tashiro et al. | 364/141 X |
| 4,633,692 | 1/1987 | Watanabe | 364/472 X |

*Primary Examiner*—Joseph Ruggiero
*Attorney, Agent, or Firm*—Oblon, Spivak, McClelland, Maier & Neustadt

[57] ABSTRACT

A target shape adjusting equipment of a metal material furnished with an expert system by adaptive inference and learning inference processing for applying the engineering know-hows of skilled operators being engaged in the control of the shape in the width direction of a band-like or plate-like metal material which is running after a specified treatment has been given thereto, to adjust the shape thereof by giving the target shape data to a shape controlling section for controlling the shape.

13 Claims, 30 Drawing Sheets

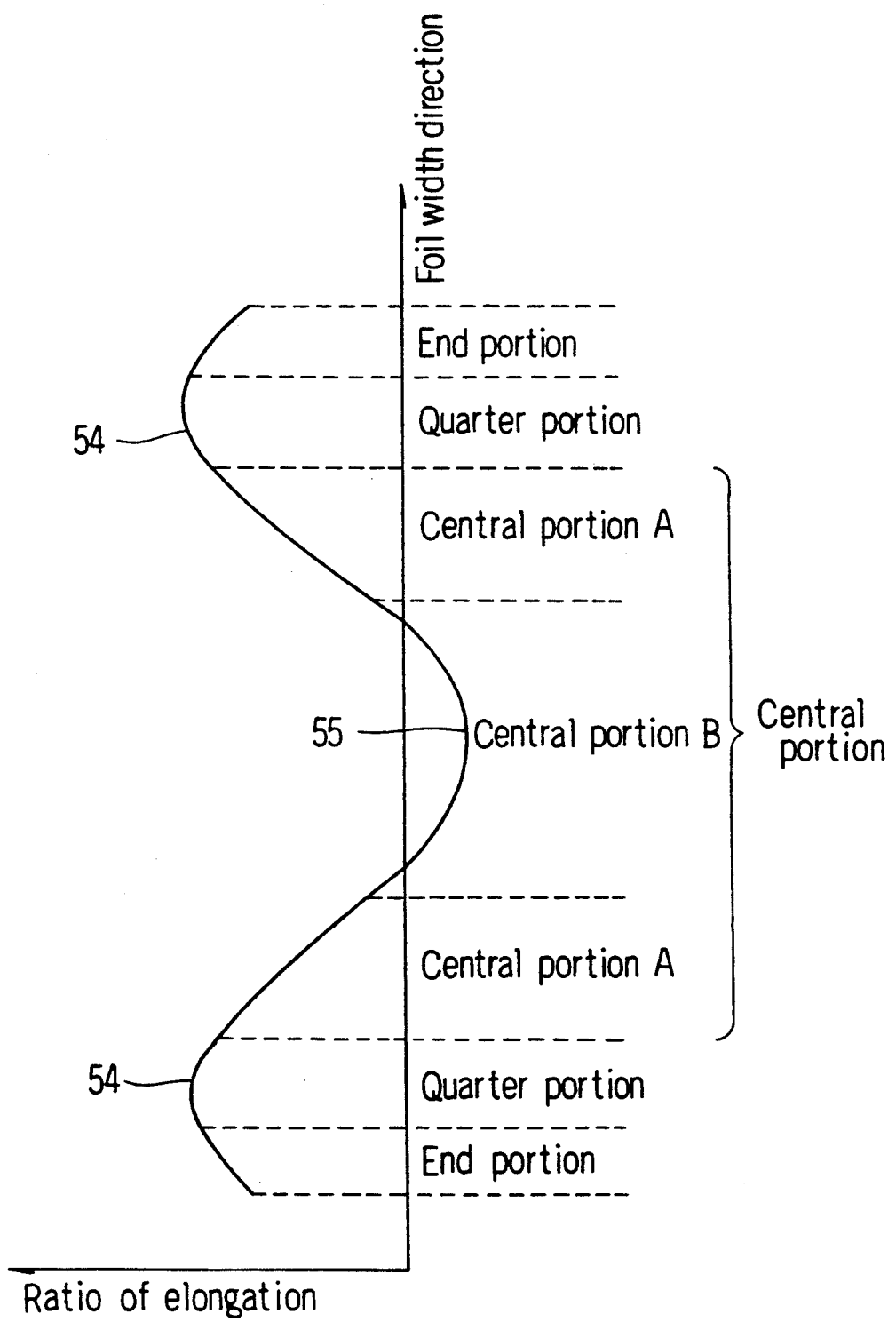

Fig. 3 (b-1)

| Actual shape classifying item | Shape (solid line: Actual shape) (Dashed line: Target shape) | Method for specifying |
|---|---|---|
| End tension | (graph showing Ratio of elongation vs Foil width direction, with $\alpha_1$ and $\beta_1$ marked, Four elements) | Judgement from the proportion between the difference $\alpha_1$ in the ratio of elongation between the point whose ratio of elongation is the highest in the range of four elements from the end and that at the end portion and the difference $\beta_1$ in the ratio of elongation of the whole actual shape |
| End elongation | (graph showing Ratio of elongation vs Foil width direction, with $\alpha_2$ and $\beta_2$ marked) | Judgement from the proportion between the difference $\alpha_2$ in the ratio of elongation between the minimum value of the ratio of elongation of the actual shape and the ratio of elongation of the end in the range from the end of the target shape to the zero point thereof and the difference $\beta_2$ in the ratio of elongation of the whole shape |

Fig. 3 (b-2)

| Actual shape classifying item | Shape (Solid line: Actual shape / Dashed line: Target shape) | Method for specifying |
|---|---|---|
| Quarter elongation | 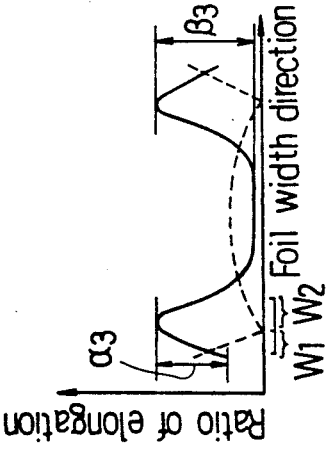 | Judgement from the proportion between the difference $\alpha 3$ in the ratio of elongation between the maximum value of the ratio of elongation of the actual shape in the range between the 40% ($W_1$) from the zero point of the target shape to the end portion and the 10% ($W_2$) of the width of the central portion and the ratio of elongation of the end and the difference $\beta 3$ in the ratio of elongation of the whole shape |
| Middle tension | 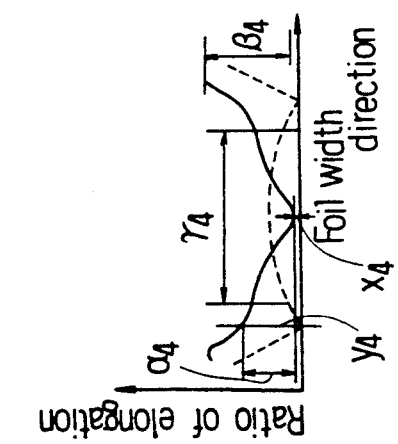 | Judgement from the proportion between the difference $\alpha 4$ in the ratio of elongation between the minimum value $x_4$ of the actual shape in the range of the width ($\gamma 4$) of the 80% of the central portion of the target shape and the minimum value $y_4$ of the actual shape at the end portion of the central portion of the target shape and the difference $\beta 4$ in the ratio of elongation of the whole different shape |

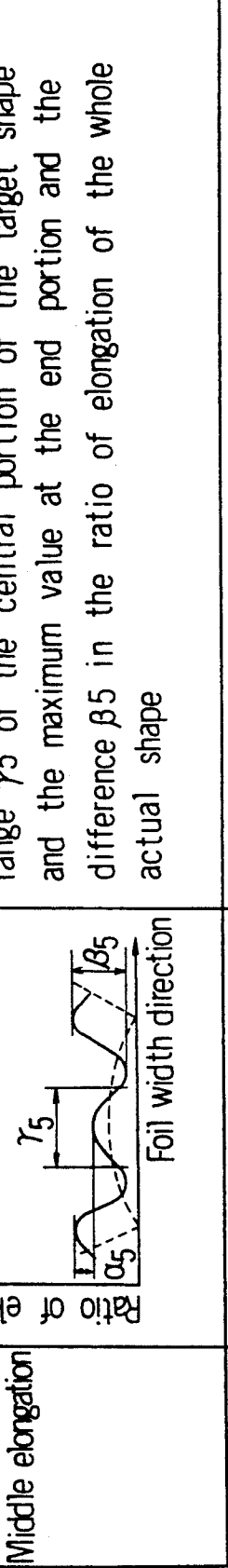 Fig. 3 (b-3)

Fig.3 (b-4)

| Actual shape classifying item | Shape (Solid line: Actual shape, Dashed line: Target shape) | Method for specifying |
|---|---|---|
| Zero point improper | 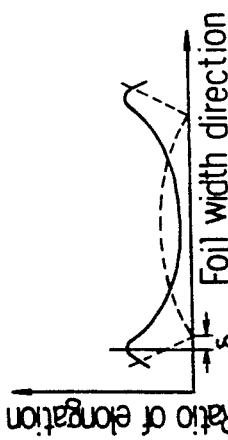 | As the zero position of the target shape is not in accord with the position of the maximum value of the ratio of elongation of the actual shape, a deviation δ occurs. |
| Non-symmetricity | 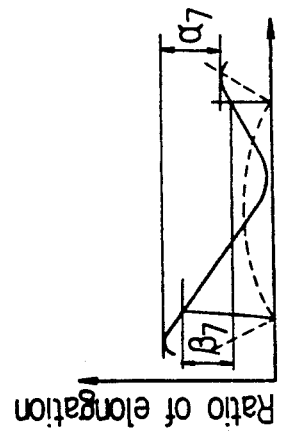 | (1). Difference $\alpha 7$ in the ratio of elongation between the maximum values at the right and the left end portion<br>(2). Difference $\beta 7$ in the ratio of elongation between the minimum values at the right and the left end portion<br>(3). Difference in the ratio of elongation between the left and the right for the end tension and the end elongation<br>Judgement from (1), (2) and (3) in the above |
| Others | | |

Fig. 4(b)

| Tendency of shape change at the time T | Actual shape classifying item at the time T | Number of the level for the actual shape classifying item | Action for compensating the number of level |
|---|---|---|---|
| Tendency of end elongation | End elongation | Less than 3 | Increase the number of level by 2 |
| | | More than 4 | Set the number of level to 5 |
| | End tension | ----- | Decrease the number of level by 2 |
| Tendency of end tension | End elongation | ----- | Decrease the number of level by 2 |
| | End tension | Less than 3 | Increase the number of level by 2 |
| | | More than 4 | Set the number of level to 5 |

Fig. 8

| Shape changing target (Control target data) | | Action (Target shape changing data) | | Priority |
|---|---|---|---|---|
| I | It is desired that the end is elongated. | I-A | Increase the level of the end. | 1 |
| | | I-B | Increase the ratio of the end portion area. | 2 |
| | | I-C | Shift the position of zero point inwardly. | 3 |
| | | --- | ----- | --- |
| II | It is desired that the end is tightened. | II-A | ----- | 1 |
| | | II-B | ----- | 2 |
| | | --- | ----- | --- |
| III | It is desired that the quarter is tightened. | III-A | ----- | 1 |
| | | III-B | ----- | 2 |
| | | --- | ----- | --- |
| IV | It is desired that the central portion is elongated. | IV-A | ----- | 1 |
| | | IV-B | ----- | 2 |
| | | --- | ----- | --- |
| V | It is desired that the central portion is tightened. | V-A | ----- | 1 |
| | | V-B | ----- | 2 |
| | | --- | ----- | --- |

Fig.10

| Before adjustment | After adjustment |
|---|---|
| 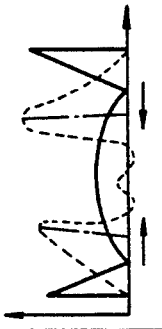 | 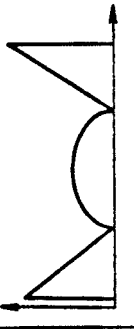 |

| Example of rule 1 | [IF] it is desired that the quarter is elongated<br>[AND] there is no zero point of the target shape according to the portion where the largest elongation in the vicinity of the quarter of the actual shape exists,<br>[THEN] shift the position of zero point to the position according to the portion of the largest elongation in the vicinity of the quarter.<br>Where the dashed line shows the actual shape and the solid line shows target shape. |
|---|---|

Order pattern

Inversed order pattern

Fig. 15

Select the item number (1). Want to elongate the end more.

(2). Want to tighten the end more.

(3). Want to tighten the quarter portion more.

(4). Want to tighten the central portion more.

(5). Want to elongate the central portion more.

------ Reset the target shape ------

(6). Want to reset to the last target shape.

(7). Want to reset to the original target shape.

------ Execute the adjustment of target shape ------

(8). Start the inference.

(9). Recommence

------ Automatic judgement of the rolling shape ------

(10). Automatic judgement of the shape

EQUIPMENT FOR ADJUSTING THE SHAPE OF A RUNNING BAND-LIKE OR PLATE-LIKE METAL MATERIAL IN THE WIDTH DIRECTION

BACKGROUND OF THE INVENTION

1. Field of the Invention

This invention relates to an equipment (apparatus) for adjusting the shape of a running band-like or plate-like metal material in the width direction thereof and especially relates to a target shape adjusting equipment for metal materials for adjusting the shape of a running band-like or plate-like metal material in the width direction thereof after a specified treatment has been given, by giving target shape data to a shape controlling section.

2. Description of the Prior Art

A reduction roll mill 2 for rolling aluminum foil, which is one of the examples showing the background of the invention is shown in FIG. 22.

In aluminum foil rolling, material aluminum foil 51, 700 through 1700 mm wide and several micron meters (μm) through several hundred micron meters (μm) thick, which is wound on the incoming side coil 50 is rolled by a pair of reduction rolls 52 at a speed of about 300 through 1,200 meters per minute, thereby causing the thickness thereof to be reduced to about one-half to one-third. The rolled aluminum foil 53 is transferred in the direction of an arrow K by a constant tension produced by rotary drive of a drive shaft at the outgoing side coil 64 (FIG. 1) and is accordingly wound on the outgoing side coil 64. For example, when aluminum foil 51, several hundred micron meters (μm) thick, is finally rolled to form aluminum foil 53, several micron meters (μm) thick, the rolling process is to be repeated several times, and the number of rolling times is called "number of pass times".

In such a metal rolling as described above, there remarkably exist an "elongated portion" and a "tightened' portion in the width direction (an arrow "L") of foil although the thickness of the aluminum foil 53 is the same as shown in FIG. 23. Namely, the elongated portion 54 forms mountain parts 56 and valley parts 57 along with the direction (an arrow "K") of transfer of the aluminum foil 53, and the tightened portion 55 is generally of plain shape. Therefore, the aluminum foil 53 shown in the figure is elongated at the central part of foil in the width direction thereof (an arrow "L") and is tightened at the end parts thereof.

Such distribution of elongated parts and tightened parts of foil in the width direction thereof (an arrow "L") as shown in the above is hereinafter called "surface shape" or "actual shape" of the aluminum foil 53. The surface shape or actual shape will greatly influence the quality of foil products. In some cases, a great tension may be given to the tightened parts 55 to cause the foil to be broken down, and the elongated parts 54 may cause wrinkles to be present. Naturally, an even or flat shape on which elongated and tightened portions are uniformly produced is desirable as the final product for aluminum foil 53. However, the actual shape is not necessarily even or flat per pass. The shape of aluminum foil 53 which exists in the passes on the way is diversified.

The surface shape of aluminum foil 53 shown in the above can be controlled by changing the shape of reduction rolls 52. As shown from FIG. 22 through FIG. 24, the reduction rolls 52 produce an expansion so-called "heat crown", resulting from heat generation in rolling and heat transmission characteristics thereof. The example shown in FIG. 24a-24c is the case that the quarter portion "a" is expanded. Such an expansion, i.e., heat crown may change the surface shape of aluminum foil 53 according to the position of appearance and the degree of expansion. Namely, aluminum foil 53 which is rolled by the portion in which the degree of expansion of the heat crown in the reduction rolls 52 is large is caused to be elongated. Therefore, the surface shape of the aluminum foil 53 can be controlled by changing the temperature or the amount of coolant 58 (FIG. 1) jetted toward the reduction rolls 52 to cool down the reduction rolls 52 in the width direction (an arrow "L" in FIG. 23) of the aluminum foil 53.

Such a shape control of aluminum foil 53, what is called a flatness control, is conducted by the shape controlling section 3 adjacent to the reduction roll mill 2. Namely, the actual shape data of elongation and tension of the aluminum foil 53 is inputted in the shape controlling section 3 from an inspection roll 4 consisting of thirty-six (36) elements 4e which are divided in the width direction and being rotatably mounted at the outgoing side of the reduction rolls 52. Each of the elements 4e is furnished with one piezoelectric element (not shown) which can function as a sensor for detecting contact pressure operating on the outer periphery of the elements 4e.

In the aluminum foil 53 which is pushed toward the elements 4e and is pulled with a constant tension in the direction of transfer (an arrow "K"), the contact pressure between the elongated portion 54 thereof and the elements 4e is detected to be small when the elongated portion 54 passes on the elements 4e. On the contrary, the contact pressure therebetween is detected to be large when the tightened portion 55 passes thereon.

Hereupon, as shown in FIG. 24, the actual shape of the aluminum foil 53 is expressed as distribution (actual shape data) in the width direction of the elongation ratio obtained by converting the contact pressure data detected by respective elements 4e. In the case of the illustrated example, the target shape is so set that, as the quarter portion "a" of the reduction rolls 52 is expanded too much, cooling the quarter portion "a" may be promoted and heat may be accumulated at the central portion of the reduction rolls 52 and at both the ends thereof.

The shape controlling section 3 compares the actual shape data with the pre-inputted target shape data and operates the result thereof, and the shape controlling section 3 can increase the coolant 58 to be jetted toward the portions of the reduction rolls 52 corresponding to the elements 4e at which the actual shape data shows higher elongation ratio. The coolant 58 is jetted from jetting tubes 59 which are provided at the incoming side of the reduction rolls 52 and which are separated for jetting in the foil width direction (an arrow "L").

Thereby the heat crown of the reduction rolls 52 is lightened to cause the portion of aluminum foil 53 corresponding to the quarter portion "a" to be deformed toward a state of tension. And in the case that the elongation ratio is lower in the actual shape data, inversed operation is to be conducted. Also, in the target shape data, the elongation ratio obtained from the elements 4e corresponding to the quarter portion "a" is frequently so set to zero (0) so that cooling the quarter portion "a" of the reduction rolls 52 can be promoted.

Here, the actual shape data may be the value outputted from the sensor or may be of such a concept as to express the shape of elongation and/or tension which is shown in the following example of the preferred embodiment.

As described in the above, in foil rolling, a final product can be obtained by repeating rolling (passes) several times. Such a plan as for securing a final product by determining how thin the thickness of the foil or how the surface shape thereof is made at the "n"th pass is called "Direction of the operation". This direction of the operation defines the target shape of elongation and tension in the passes on the way together with the target in thickness, in order to finish the final products to an even and flat shape of uniform elongation and tension.

The distribution of elongation and tension is passes on the way as shown in the above may differ in the actual operation. This is because operation conditions such as deformation (heat crown) due to heat on the reduction rolls is different on respective passes. For this reason, the direction of the operation defines the target shape of elongation and tension in each of the passes, taking somewhat predictable operation conditions into consideration, in the actual operation conditions thus described above.

However, such a target shape of elongation and tension as in the direction of the operation may not be often in accord with the actual target shape of elongation and tension by the shape controlling section 3, i.e., the target shape data. For instance, there is a case that a good result has been accomplished by so setting the target shape data to be set in the shape controlling section 3 as shown with a solid line in FIG. 25 when rolling a certain material by a reduction roll mill at a certain pass, aiming at the target shape on the direction of the operation as shown with a dashed line in FIG. 25.

Thus, the reason why the target shape on the direction of the operation is not in accord with the target shape in the actual controlling is that even though the coolant amount for the reduction rolls 52 is divided and adjusted in correspondence with the elements 4e of the inspection roll 4 the heat crown shifts due to the heat transmission of the reduction rolls and the shifting pattern thereof may change from time to time according to such operation conditions as the kind of a metal material, the surface shape of the above reduction rolls, heat balance, temperature, rolling speed and foil base shape. Influences by the operation conditions and the kind of materials as shown in the above can seldom be expressed with any mathematical model. It belongs to skill or engineering know-how. Therefore, the target shape data must be adjusted, corresponding to various kinds of actual shape which may appear on the way of respective passes, in order to approach the direction of the operation as much as possible.

For this reason, in the conventional controlling equipment for foil rolling and other metal rolling, it has not been possible to automatically set the target shape data in each of the passes. It depends upon the senses of skilled operators having rich experiences in this field. Therefore, such a conventional system has not been suitable for producing aluminum foil along with the ideal direction of the operation by securing timely and accurate control.

Also the shape judgement of the actual shape which is reflected on the target shape as shown in the above depends upon the visual judgement of an operator 5 since before, and it is not convenient on the current shape management and control, judging from such human error factors as personal differences, other difference in the skill accomplishment, etc.

Also, in the above reduction roll mill 2, it has a large meaning in controlling the process that not only large and small sizes of the actual shape data pertaining to the elongation ratio from individual elements 4e of the inspection roll 4 but also the whole patterns of the surface shape, i.e., shape conditions and the degree thereof are judged. However, according to the conventional manner of detecting the shape, as it has depended upon the experiences and senses of operators that the whole pattern of the surface shape is judged, it needs skills and has only less suitability.

And in such a reduction roll mill 2 as shown in the above, the surface shape of aluminum foil 53 may change with a constant tendency maintained even though aluminum foil is rolled under the same condition. For instance, as both the ends of the reduction rolls 52 are getting heated, an expansion portion "a" called "heat crown" appears at both the ends of the reduction rolls 2 as shown in FIG. 24 and the degree of the expansion may be gradually increased. Therefore, the surface shape of the aluminum foil 53 is apt to be elongated at the end portion thereof.

The tendency in change of the surface shape thus described in the above is as shown in Table 1.

TABLE 1

| Item | Tendency in change of the shape |
| --- | --- |
| (1) | The end portions of aluminum foil are apt to be tightened. |
| (2) | The end portions of aluminum foil are apt to be elongated. |
| (3) | The elongation and tension of the end portions of aluminum foil are cyclically changed. |
| (4) | The foil condition is constant and stabilized. |

For example, when the current surface shape is specified as "end elongation" and the degree thereof is in the level 3, the method of adjusting the target shape to be matched in future in the tendency described in the item (1) in Table 1 must be different from that in the tendency did in the item (2). In the case of the tendency shown in the item (3), it is necessary to decrease the control gain on setting the target shape data given to the shape controlling section 3 which controls the surface shape.

On the other hand, there is a case that all the rolling conditions can not be expressed only by the actual shape data at this moment and the tendency in change of the shape led out by the operation from the actual shape data. That is, unless the data is sampled periodically and the actual shape data at several kinds of time in the past is used, there exist many statistical characteristics informations which can not be obtained, such as, for instance, the tendency in change of the sampled data described in the above, average, dispersion, correlation between data, three-dimensional pattern recognition, etc.. And such a statistical characteristics information as thus shown is important for adjusting the surface shape of aluminum foil 53.

Thus, the target shape must be changed according to the operation conditions or the actual shape which may change from time to time.

However, as for the target shape data, the judgement for the necessity of changing the target shape for when to change the target shape and starting the action to change and to adjust the target shape depend upon an operator 5. Therefore, automatic action for changing and adjusting the target shape was not possible. For this reason, it was not possible to adjust the target shape so that it can be properly and timely changed, following the operation conditions of aluminum foil rolling which may minutely change.

Furthermore, in the case that both the judgement for the necessity of change of the target shape and the starting of adjustment of the target shape change are automatically carried out through judgement by utilization of the threshold values for the actually detected shape data, the actual shape data is processed as binary logic of 1 and 0 after having judged the threshold value. Therefore, it was impossible to minutely grasp the degree of abnormality of the actual shape. For example, it was not possible to make such a judgement as for starting the adjusting action even though the actual shape data pertaining to a certain state "A" partitioning to the actual shape even slightly exceeds the threshold value when both the above state "A" and another state "B" are abnormal at the same time without starting the above adjusting action if the actual shape data slightly exceed the threshold value when only a state "A" is abnormal.

As described in the above, in the case that only the latest actual shape data is used although both the past statistical characteristics information pertaining to the actual shape data of aluminum foil 53 and the so-called latest actual shape data at the moment are important, it can not be said that it is enough to judge the necessity for changing the above target shape.

On the other hand, the inference rule on the basis of the knowledge obtained through the experiences of a skilled operator, that is, the inference processing on the basis of the inference rule in which the condition section is regarded as the above actual shape state and the conclusion section is regarded as action corresponding to the above state can apply to the target shape adjusting equipment of the band-like or plate-like metal material which is running. However, in this case, when it is judged that the actual shape of aluminum foil 53 which is produced by the control of the reduction roll mill 2 reverts to two or more various kinds of states, respective action options corresponding to each of the above states are selected. If there occurs a case that contradiction may be brought in the contents among the corresponding actions, the inference rules furnished with respective actions are competed each other, thereby causing a proper action not be determined.

In the case that the actions having the same content are selected at the same time, corresponding to each of the above states according to the results of having judged that the above actual shape reverts to a plurality of states as well as in the above, such a problem as redundancy on execution of the actions may occur, thereby causing an action having the same content which intends to change the above states to be performed subsequently or at the same time.

Additionally, in the case it is judged that the actual shape of aluminum foil reverts to a certain state, there may exist a plurality of actions corresponding to the corresponding state. Unless the operation condition is changed as the algorithm for selecting a single or a plurality of actions among these actions is executed according to the operation conditions described in the above, the corresponding action is repeatedly selected and executed even in the case that the selected action takes no effect on the actual shape state of the aluminum foil 53.

Under such conditions as shown in the above, even in the case that the contradiction among the actions shown in the above and/or the redundancy are dissolved and a proper action is determined, the action is not necessarily effective for the states of the aluminum foil 53.

SUMMARY OF THE INVENTION

This invention has been made in order to solve the problems in the prior arts shown in the above.

It is therefore the first object of the present invention to provide a target shape adjusting equipment of a metal material for automatically and properly adjusting and setting the target shape data, which is given to the shape controlling section thereof, according to changes of the operation conditions, in order to produce a band-like or plate-like metal material of the requested shape under a stabilized condition.

To change and set the target shape data properly, it is necessary to properly judge the pattern of the whole surface shape of a running band-like or plate-like metal material in the width direction thereof.

Therefore, it is the second object of the invention to provide a shape detecting equipment for a band-like or plate-like metal material, which can judge the pattern of the whole surface shape of the running band-like or plate-like metal material in the width direction thereof, and which can give the objective judgement information to the process which or an operator who can deal with the above metal material.

And in the conventional shape controlling section 3, as the target shape and the control gain have been adjusted only according to the result of judgement of the actual shape at only a moment, a wrong guess control may be executed in some cases, and such a proper control as the tendency of changes of the surface shape can be taken into consideration could not be always carried out.

Therefore it is the third object of the invention to provide a metal rolling shape adjusting equipment which can grasp the tendency of changes of the shape of metal occurred when the rolling characteristics of a reduction roll mill is greatly changed and which can accurately adjust the above shape on the basis of the corresponding tendency of changes and the latest actual shape information by predicting the above tendency of changes.

On the other hand, it is impossible to express all the rolling conditions only with the above tendency of changes of the shape. There is a case that the past statistical characteristics information pertaining to the above shape will be important in properly expressing the above rolling conditions.

Therefore, it is the fourth object of the invention to provide a metal rolling shape adjusting equipment which can adjust the above shape accurately on the basis of the statistical characteristics information by operating the past statistical characteristics information of the shape of metal.

In the case of starting a control system for controlling a plant including an equipment for adjusting the shape of a metal material in the width direction thereof as explained in the above, it is highly recommended that a rational starting method in which the necessity of the system starting is taken into account is adopted to properly grasp the situation of the plant which minutely changes from time to time and to properly and timely drive the above control system even though judgement for the necessity of starting the corresponding control system and the starting operation thereof are left to only a person or the above judgement and the starting operation thereof are executed by operation processing utilizing the set threshold values.

It is therefore the fifth object of the invention to provide a rational system drive equipment by which a control system, etc. can be properly and timely driven according to the operation conditions of a plant.

Furthermore, in the case that the corresponding system reverts to two or more kinds of states which will be the condition section of the inference rule when inference processing on the basis of the inference rule as shown in the above is adopted in a system including the above target shape adjusting equipment, a contradiction may occur between the actions corresponding to each of the above states or redundancy pertaining to execution of the action may occur.

Therefore, it is the sixth object of the invention to provide an action determining equipment which can dissolve the contradiction between the actions and the redundancy thereof and can determine a proper action even though respective actions corresponding to two or more kinds of specified states to which the above system reverts are selected, the content of the corresponding actions is in contradiction each other or redundancy may occur in relation to execution of these actions even if the contents of the action is the same.

When as shown in the above it is judged that the above system reverts to a certain state, the corresponding state is continued without taking any effect for the corresponding state of the action corresponding to the state.

Therefore, it is the seventh object of the invention to provide an action determining equipment which does not repeatedly select the action by changing the priority of the action when a state to which the system reverts is continued and any effect of the action corresponding to the state is not yielded for the above state.

And as described in the above, even though the contradiction between the above actions or the redundancy is dissolved and a proper action is determined, the action does not necessarily take an effect for the state of the above system.

It is therefore the eighth object of the invention to provide an action determining equipment which can determine the optimal action at all times by attempting to optimize the action selected in correspondence with a certain state so that a specified action can not be repeatedly selected in the case that an effect can not be yielded for the above state by executing the action and furthermore by attempting to optimize the action selected between the states by dissolving the contradiction between the actions corresponding to the states and/or redundancy thereof even in the case that the system can revert to two or more kinds of the states.

This specification of the present invention specifically points out the subject thereof and is completed with the claims clearly claimed. The above, and other objects, features and advantages of the present invention, will become apparent from the following description taken in conjunction with the accompanying drawings.

BRIEF DESCRIPTION OF THE DRAWINGS

FIG. 4(b) is an explanatory view showing actions by which the number of level of the actual shape classifying items is compensated by taking the tendency of changes of the shape into consideration, FIG. 8 is an explanatory view showing an example of the relationship the shape changing target for the actual shape classifying items and the action options corresponding thereto, FIG. 10 is an explanatory view showing the rules to be used for the inference at the inference portion of action options and the example in which the target shape has been changed by using the rules, FIG. 15 is a display view showing the menu for input displayed on a CRT display screen of a terminal computer at the side a reduction roll.

DETAILED DESCRIPTION OF THE PREFERRED EMBODIMENTS

Figure 1:
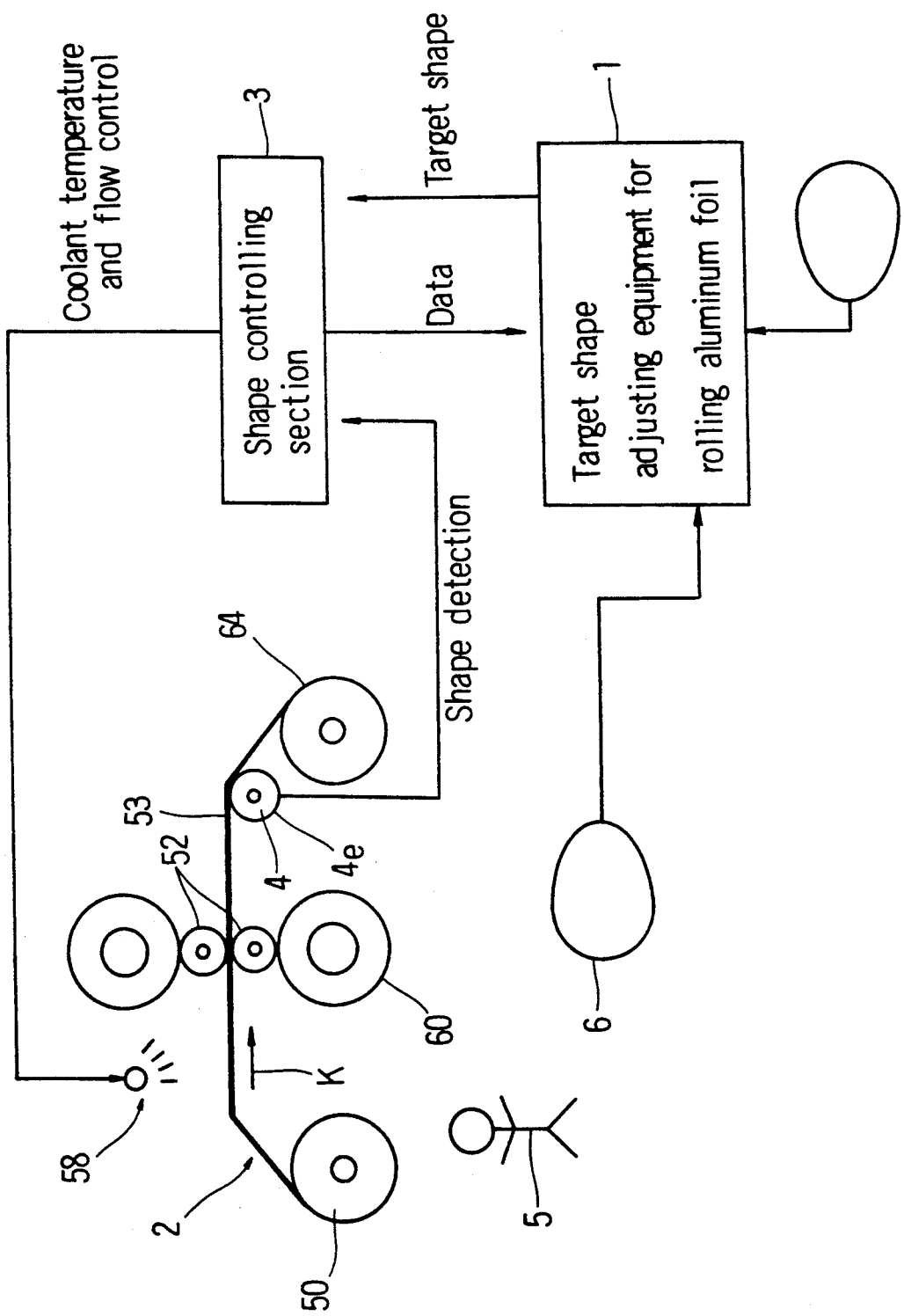
FIG. 1 is a view of the outline showing the arrangement of a system of a target shape adjustment equipment for rolling aluminum foil pertaining to one of the preferred embodiments of the invention.

A target shape adjusting equipment 1 for rolling aluminum foil according to the invention is suitable for a process on-line control as expert system by systemizing the control know-how of an operator. Prior to the detailed description of this system, the outline of the system configuration of the above target shape adjusting equipment 1 for rolling aluminum foil is described with reference to FIG. 2.

The target shape adjusting equipment 1 for rolling aluminum foil consists, as shown in the figure, mainly of a rolling data collecting section 7, a rolling condition analyzing section 8, a control target generating section 9, an action option inference section 11, a target shape generating section 12 and an action effect evaluating section 10. The equipment 1 is provided with a knowledge base D1 for analyzing the rolling conditions, a knowledge base D2 for setting the control target, a knowledge base D3 for action inference (including the knowledge for maintaining the matching of rules and the properness of actions) in which the knowledge of the operations are respectively housed and work memories M1, M2, M3, M4 and M5 in which various kinds of data are provisionally accommodated. The outline of the processing in each of the above sections is explained in the ensuing description.

In the target shape adjustment equipment 1 for rolling aluminum foil, the inference processing is firstly started by inputting by keys at a terminal computer at the side of an aluminum foil reduction roll mill 2, thereby causing the operation condition data from the aluminum foil reduction roll mill 2 to be inputted through the shape controlling section 3.

① Rolling Data Collection Section

The rolling data collection section 7 receives the operation condition data including the actual shape data from the shape controlling section 3 and writes the same in a work memory M1.

② Rolling Condition Analyzing Section

The rolling condition analyzing section 8 analyzes the above actual shape data and judges the rolling condition of aluminum foil 53. Namely, the rolling condition analyzing section 8 judges a degree at which the above actual shape data can respectively match up to the actual shape patterns stored in the knowledge base D1 for analyzing the rolling conditions, which is classified into several kinds of patterns in advance, and simultaneously analyzes the current target shape data.

③ Control Target Generating Section

The control target generating section 9 sets a control target regarding which direction the actual shape of aluminum foil 53 is to be adjusted to, in compliance with the results of analysis of actual shape data by the rolling condition analyzing section 8 and the input by an operator 5 from a terminal computer 6.

④ Action Option Inference Section

④-(1). Rule Inference

According to the rule inference to which the rules of the IF-THEN type in which the above control target, the operation conditions, etc. are regarded as condition section and actions, etc. to realize the above control target are regarded as conclusion section, stored in the knowledge base D3 for action inference are applied, the action option inference section 11 writes the action, which has been judged to be reasonable, in a work memory M5. In this writing, the following processings are conducted.

④-(2). Dissolving Contradictions and Redundancy

In the case that two or more kinds of control targets are selected and two or more kinds of mutually conflicted action options are taken in correspondence therewith, the action of the control target which can be deemed to be more important or the action which can be determined in compliance with an attribute selected among the attributes (a) through (e) shown below or a combination of two or more kinds of the attributes is applied.

a). attribute showing a degree of seriousness on the control rule preset per actual shape classifying item described later (FIG. 3) g-1 through b-4)) (Degree of seriousness), b). attribute showing the degree at which the actual shape data of aluminum foil 53 can revert to the above actual shape classifying item (Degree of certainty), c). attribute showing a subject which judges to which two or more kinds of actual shape classifying items the actual shape data reverts (Subject), d). attribute showing a degree of execution of the above determined action (Degree), and e). attribute showing a degree of necessity to change the conditions of the above actual shape (Degree of importance)

④-(3). Learning of Invalid Actions

In the case there exist a plurality of action options for a certain control target in the above rule, the order of priority is given to the action options and only the action of the highest rank of the priority is applied. An action was executed and took no effect in order to realize a certain control target is not repeatedly adopted even through the same control target is set in the next time.

⑤ Target Shape Generating Section

The target shape generating section 12 generates a new target shape data in compliance with the action taken in the above and outputs the same to the shape controlling section 3. On the basis of this target shape data, the shape controlling section 3 controls a reduction roll mill 2 of aluminum foil 53.

⑥ Action Effect Evaluating Section

The action effect evaluating section 10 evaluates whether or not the control of a reduction roll mill 2 for rolling aluminum foil on the basis of an applied action has been effective according to the results of data analysis and by inquiring to an operator 5. The action that has been evaluated not to be effective at this time is memorized in a work memory M4 and is referred to in the coming inference of action options in the action option inference section 11.

Figure 2:
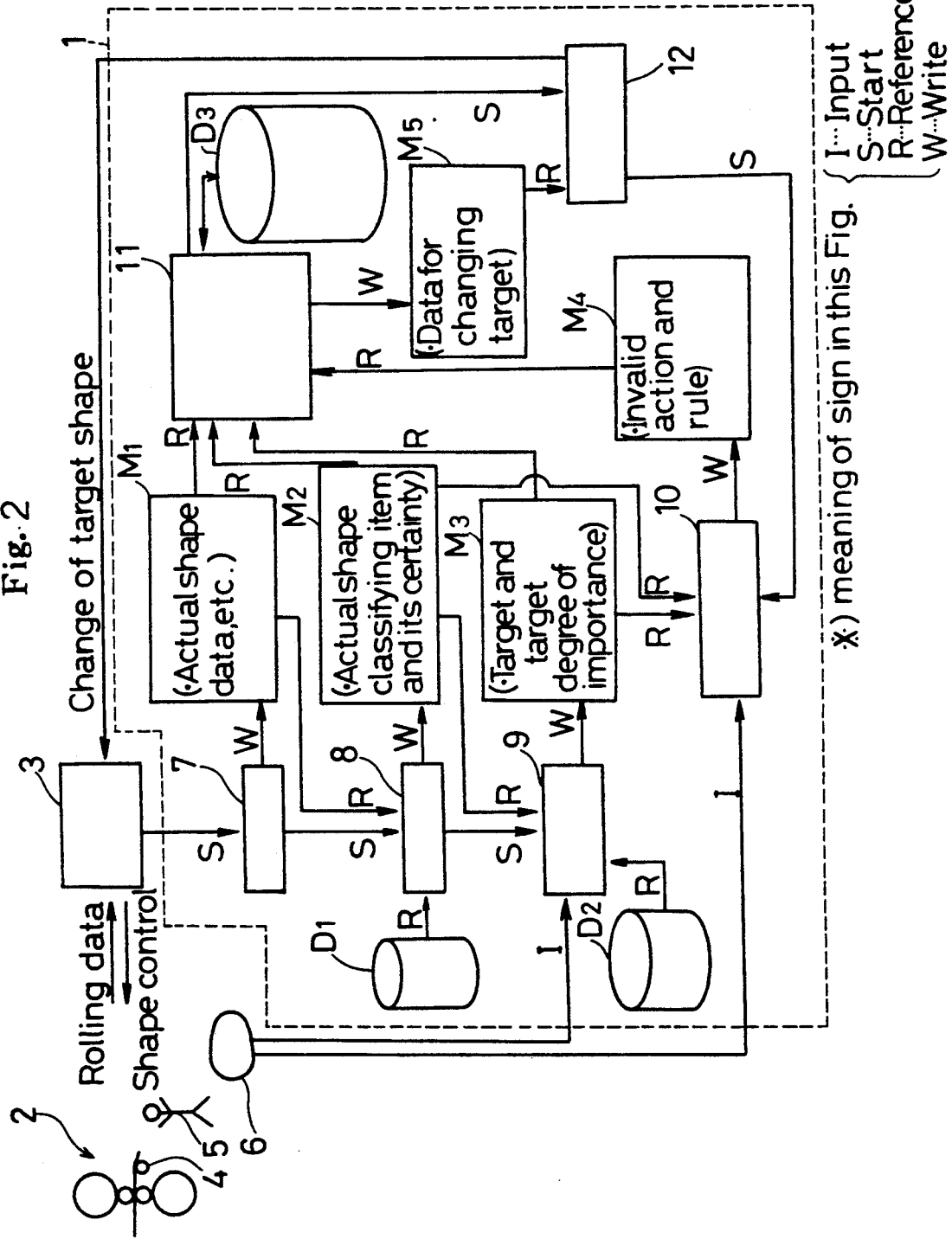
FIG. 2 is a diagram showing the processing flow of the target shape adjusting equipment for rolling aluminum foil, FIG. 3 (a) is an explanatory view showing the principal parts of the actual shape data expressed with the distribution of the ratio of elongation of aluminum foil in the width direction thereof, FIGS. 3(b-1) to 3(b-4) are other explanatory views showing the actual shape classifying items of pattern-classified aluminum foil.

As shown in FIGS. 1 and 2, the target shape adjusting equipment 1 for rolling aluminum foil outputs the target shape data, which will be the criteria of the control, to the shape controlling section 3 for controlling the jetting amount of coolant 58 or the temperature thereof so that the actual shape of aluminum foil 53 can be adjusted. At the same time, the target shape controlling equipment 1 for rolling aluminum foil is given the operation condition data by the shape controlling section 3.

Figure 23:
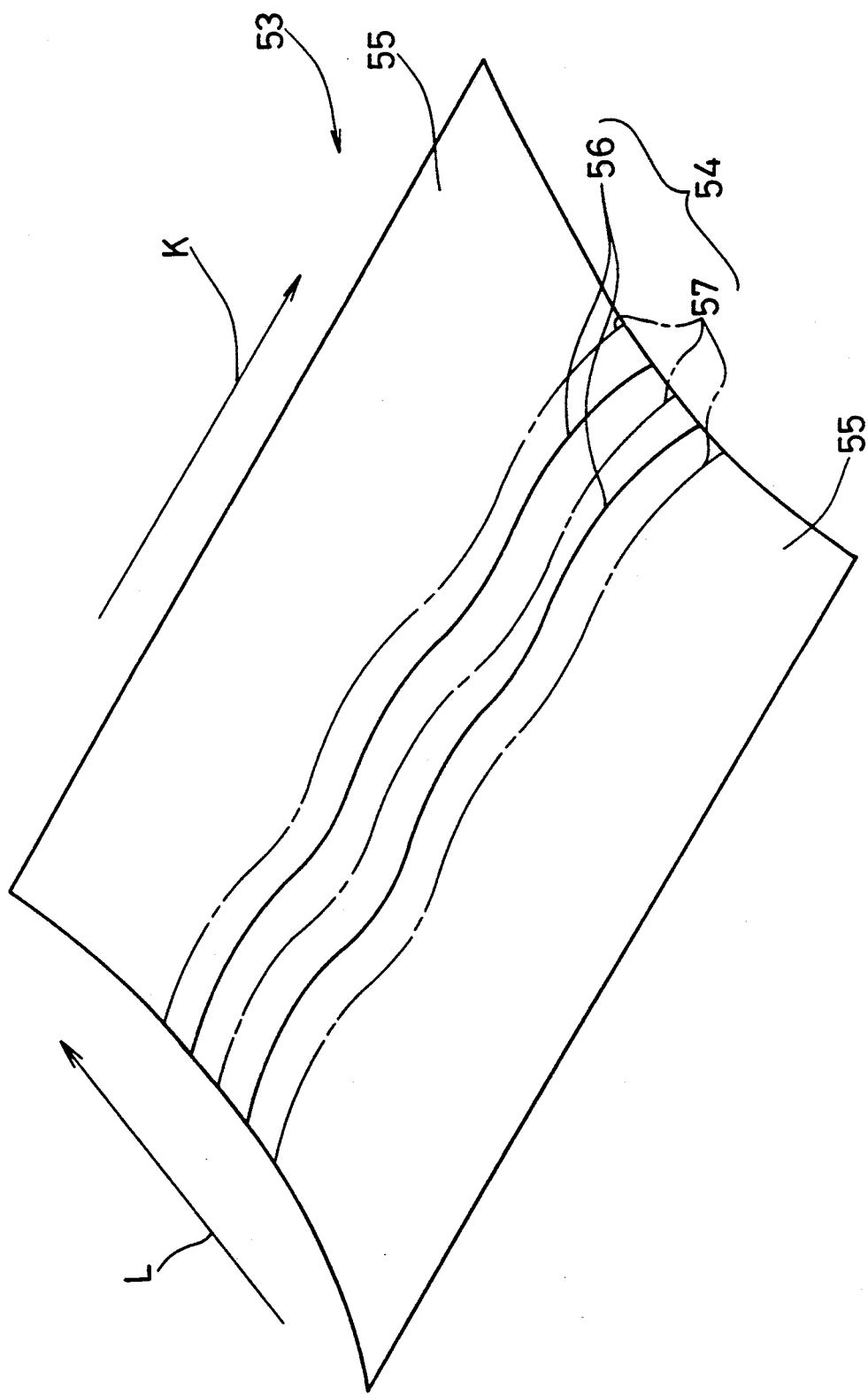
FIG. 23 is an appearance view showing the surface shape of aluminum foil after rolling.
Figure 24:
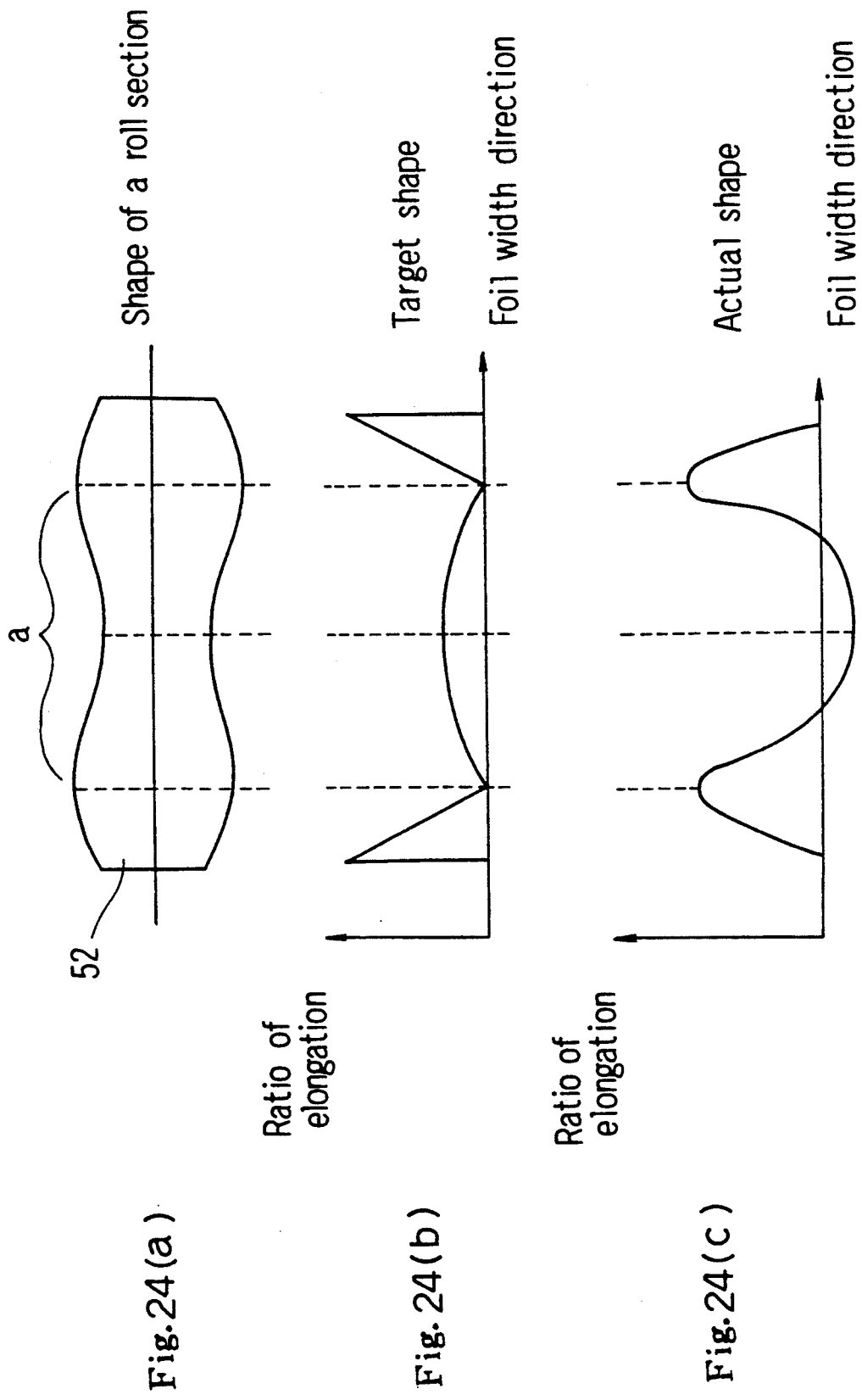
FIGS. 24a, 24b, and 24c are explanatory views showing the correlation between the sectional shape of a reduction roll, the actual shape of aluminum foil and the target shape for controlling the actual shape thereof.
Figure 25:
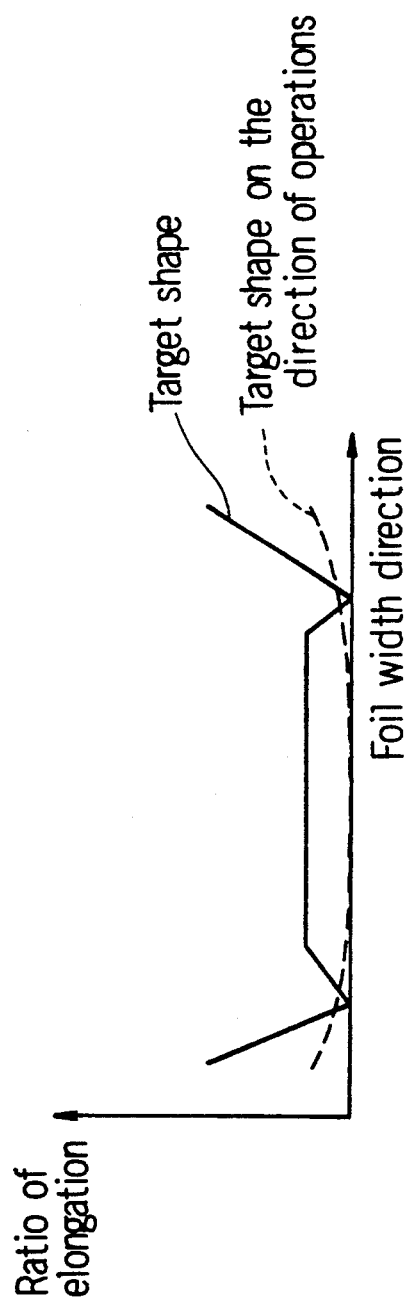
FIG. 25 is a graph simultaneously showing the target shape on the operation of aluminum foil and the target shape to be set for controlling.

As a method for adjusting the actual shape of aluminum foil 53, there is another method of controlling the push-up force of a push-up roll 60 by which the lower reduction roll 52 is forced upward toward the upper reduction roll 52. However, in this embodiment of the invention, the ensuing description copies with only the control of coolant 58. ① Collection of the operation condition data In the target shape adjusting equipment 1 for rolling aluminum foil, the inspection roll 4 is provided downstream in the direction of transfer (an arrow "K") of the reduction rolls 52. Inspection roll 4 includes an assembly of elements 4e which are furnished with sensors for detecting the actual shape data showing the elongated portions 54 and the tightened portions 55 (FIG. 23) of aluminum foil 53 in the rolling. The actual shape data is output to the rolling data collecting section 7 (FIG. 2) by way of the shape controlling section 3. The rolling data collecting section 7 writes and renews the operation condition data (Table 2), which is transferred from the shape controlling section 3 with an appointed interval of time, in a work memory M1, thereby causing the rolling condition analyzing section 8 to be started.

TABLE 2

| Operation condition data |
|---|
| Current target shape data, |
| Current actual shape data, |
| Temperature and jetting amount of the coolant, |
| Push-up force at both the drive side and the work side, |
| Rolling speed, |
| Foil speed at the outgoing side of the rolls, |
| Pass code (Coil material ID), |
| Incoming side coil number, |
| Material of the incoming side coil, |
| Hardness and thickness of the material foil, |
| Thickness of the incoming side foil and the outgoing side foil, |
| Width of the foil, etc. |

② Analysis of the Actual Shape Data

The knowledge base D1 for analyzing the rolling condition to operate the elongation condition and the tension condition (respective actual shape classifying items) of the aluminum foil 53 in rolling and the degree thereof, in accordance with the actual shape data detected by the element 4e (sensor) stores both actual shape classifying items such as for example "end tension" through "double-protruded elongation" and a specified program of respective items to specify the above actual shape classifying items corresponding to the actual shape data detected by the above elements 4e to show the actual shape conditions as shown in FIG. 3 (b-1 through b-4).

Here, the method for specifying the actual shape classifying items is described below.

The actual shape data detected as distribution of the tension from the elements 4e can be obtained in a form of the distribution of the ratio of elongation in the foil width direction as shown in FIG. 3(a). The actual shape data shown in the figure consists of the end portion, the quarter portion, the central portion A and the central portion B from the outside of the foil, and the central portions A and B constitutes the whole central portion. And in this case, the tightened portion 55 is positioned at the central portion B, and the elongated portion 54 is positioned at the quarter portion.

As shown in FIGS. 3(b-1) through b-4), the actual shape classifying items stored in the above knowledge base D1 for analyzing the rolling condition are mainly classified into five types as shown below;

(1). "End tension" ..... Such a condition that the ratio of elongation at the end portion gets lower and lower as going toward the end portion is considered to be "end tension". It is judged from the following two points;

①. Whether or not the value at the end portion is the minimum value of the whole width ②. Degree of the difference of the ratio of elongation between the end portion and the quarter portion.

(2). "End elongation" .... Contrary to the end tension, such a condition that the value at the end portion is remarkably larger than that at the other portions is considered to be "End elongation". Thus, it is often preferable that the actual shape of which end portion is somewhat elongated. But if the end portion is elongated too much, it is regarded as faulty shape.

(3). "Quarter elongation" ...... This quarter elongation is judged from how large the ratio of elongation of the most elongated portion in the vicinity of the portion corresponding to the zero point set in the target shape is in comparison with that at the end portion. As shown in the above, the actual shape at the quarter portion is most apt to be elongated, and this type of elongation appears in almost all the actual shapes.

(4). "Middle tension" ..... The tension condition (lowness of the ratio of elongation) of the central portion and that of the end portion are compared and judged.

(5). "Middle elongation" ..... In the case that the difference between the ratio of elongation at the most elongated point of the central portion and that of the most elongated point (in almost all the cases, the end portion or the quarter portion) in the whole width is small or negative, the condition is regarded as "Middle elongation". This middle elongation is classified into two kinds as shown below:

① The case that the central portion is elongated is general middle elongation.

② The case that elongation occurs between the quarter portion and the central portion and the central portion is tightened is double-protruded elongation.

In addition, the following "non-symmetry" and "Zero point improperness" exist as peculiarly actual shape classifying items.

"Non-symmetry" ..... usually, both the target shape and the actual shape are almost asymmetrical in the foil width direction. The shape in which this symmetry is broken is called "non-symmetrical shape". In the case that either one or both of the following two cases is established for a certain shape, the shape is regarded as "non-symmetry".

①. Either difference in the ratio of elongation of each maximum value at the right and the left end portions or each minimum value thereof is large.

②. Where the end tension occurs at one end portion and the end elongation does at the other end portion.

"Zero point improperness" .... This case means that the portion of zero point set in the target shape is not in accord with the portion showing the maximum value of the ratio of elongation in the actual shape. Usually, heat is apt to be accumulated at the quarter portion "a" of the reduction rolls 52, thereby causing the quarter portion of the actual shape corresponding to the above quarter portion "a" to be most apt to be elongated. Hence, when setting the target shape, the zero point is set at the most elongated point of the quarter portion of the actual shape. And if these portions are not in accord each other it is necessary to adjust them so that they can coincide with each other.

Which actual shape classifying items the current shape condition of the aluminum foil 53 corresponds to is judged from the detected actual shape data in accordance with the item of "Method for specifying" in FIG. 3 (b-1 through b-4). The method is stored in the knowledge base D1 for analyzing the rolling conditions as programs as described in the above.

Thus, one or more than two kinds of actual shape classifying items, for judging that the actual shape data which is inputted from the work memory M1 can be in the state, are operated by the specified program in the rolling condition analyzing section 8.

Usually, the actual shape classifying item for judging that a certain actual shape is in a certain state is not necessarily selected only by one. As the actual shape data is obtained as a result of the complicated operation conditions, there are many cases that the actual shape data is under a condition of two or more kinds of the actual shape classifying items. In this case, some of the actual shape classifying items are in a close causality with the actual shape data and the others are in a weak causality therewith. Such a causality, i.e., the degree of the shape condition is called "Degree of certainty" (Attribute).

The above rolling condition analyzing section 8 focuses the actual shape data to one or more than two actual shape classifying items in compliance with a certain degree of certainty which can be led out from a proper function and memorizes the corresponding actual shape classifying items and the degree of certainty thereof in the work memory M2. For example, in the case that the proportion $\beta2/\alpha2$ between the difference $\alpha2$ between th ratio of elongation of the portion having the highest ratio of elongation in the range of actual shape data inputted by the four elements 4e from the end where aluminum foil 53 is placed and the ratio of elongation at the end portion and the difference $\beta2$ between the maximum value and the minimum value of the ratio of elongation in the whole actual shape data exceeds an appointed set value, it is comprehended that the actual shape of this time includes an actual shape classifying item "End elongation", and the actual shape is given a degree of certainty from 0 to 1 according to the value of the above proportion. This is the same operation for all the other actual shape classifying items.

In this case, the statistical characteristics information, for instance, average, the tendency of changes, dispersion, correlation, the three-dimensional pattern recognition, etc. are operated in compliance with the actual shape data in the past appointed period of time, which comes from the work memory M1, and the degree of certainty per actual shape classifying item can be operated on the basis of the corresponding statistical characteristics information, i.e., using the corresponding statistical characteristics information as variables of the degree of certainty.

For instance, the actual shape at a certain time may be remarkably different from the actual shape before and after the time due to a certain reason. Concretely speaking, a state of "end elongation" is detected at a moment, resulting from abnormality in the shape of a material plate before rolling, while the actual shape of "end tension" is continued, and thereafter the original state of "end tension" is continued again.

Hereupon, when using the average value of the statistical characteristics information of the actual shape data at several points of time in the past up to a certain time, it is possible to judge the trend of the rolling conditions without being influenced by the above noise factors.

Next, the case that the tendency of changes of the actual shape data for an appointed period of time in the past is employed as statistical characteristics information is described below in details. The tendency is operated, for example, in compliance with the processing sequence of the flow chart of FIG. 4(a). On rolling aluminum foil 53, the actual shape data of aluminum foil 53 obtained from the inspection roll 4 at the side of a reduction roll mill 2 is sampled with an appointed interval of time by the rolling data collecting section 7 (S40).

Next, in the rolling condition analyzing section 8, the actual shape data is compared with the above actual shape classifying items, specified as certain actual shape classifying items and expressed the degree with the number of level shown by natural numbers 0 through 5. Namely, the rolling condition of aluminum foil 53 is judged (S41).

For example, in the case that the proportion $\beta2/\alpha2$ between the difference $\alpha2$ between the ratio of elongation of the portion having the highest ratio of elongation in the range of actual shape data inputted by the four elements 4e from the end to which aluminum foil 53 is pushed and the ratio of elongation at the end portion and the difference $\beta2$ between the maximum value and the minimum value of the ratio of elongation in the whole actual shape data exceeds an appointed set value, it is judged that the actual shape of this time includes an actual shape classifying item of "End elongation", and the degree of "End elongation" is expressed with the number of level shown by the natural numbers 0 through 5 according to the above proportion.

Furthermore, in the step S42, the number Ht of shape points from $-5$ through $+5$ is determined for the actual shape data at the time T and memorized in a memory section (not shown) which can store the number Ht of shape points for an appointed period of time.

This embodies the method of handling experienced by an operator 5 in specifying an actual shape data to an optional actual shape classifying item and it is what both the degree of certainty of the actual shape classifying item to which a certain actual shape is suited and the degree of certainty of an actual shape classifying item in which the actual shape classifying item is conflicted with the states of elongation and tension are converted to as double coordinates consisting of positive and negative natural numbers centering around zero (0) so that an operator can easily understand when being displayed, for instance, on a terminal computer 6.

For instance, in the case that the actual shape classifying item is "End elongation" and the degree thereof is the level 5, the number of shape points is regarded as +5. If the degree thereof is the level 1, it is regarded as +1. And in the case that the actual shape classifying item is "End tension" and the degree thereof is the level 5, it is regarded as −5. If the degree thereof is the level 1, it is regarded as −1. And in the case the actual shape data does not correspond to both "End elongation" or "End tension", it is regarded as zero (0).

When it is necessary to change and adjust the target shape by input from a terminal computer 6 at the side of a reduction roll mill 2 in accordance with the request of an operator 5 or by input from the rolling condition analyzing section 8 (S43), the tendency of changes of the actual shape for an appointed period of time up to this moment is operated in the step S44.

For instance, the tendency of shape change at the time T is operated from the number of shape points $H_{t-i+1}, \ldots, H_t$, which is provided by the number "i" in the past. Herein shown is the example which is operated in accordance with the number of shape points $H_{t-9}, \ldots, H_t$ which are provided by the number 10 in the past. Firstly the difference $H_d$ in the number of shape points, which is shown in the following equation, can be obtained from the maximum value and the minimum value among the number of shape points $H_{t-9}, \ldots, H_t$.

$$H_d = max (H_{t-9}, \ldots, H_t)$$

At this time, in the case that the difference $H_d$ of the number of shape points is less than 2, it is judged that the actual shape of aluminum foil 53 is stabilized and any tendency of the shape change is not recognized.

If the the difference $H_d$ is more than 3, it is firstly judged whether or not the actual shape is in a cyclically changing state. For instance, if the number of times that the actual shape has been changed in the direction for increasing the number of shape points in the range of the number of shape points $H_{t-9}, \ldots, H_t$ is regarded as $H_+$ and the number of shape points that the actual shape has been changed in the direction for decreasing the number of shape points is regarded as $H_-$, the following expression is established;

$$|H_+ - H_-| \leq 3 \text{ and } 3 \leq H_d \leq 4$$

Namely, in the case that the absolute value of the difference between $H_+$ and $H_-$ is less than 3 and the difference $H_d$ of the number of shape points is more than 3 and less than 4, it is judged that the actual shape is in a cyclically changing tendency.

And in the case that the $H_d$ is more than 2 and in other cases than the above expression, it it judged that the tendency of shape change is recognized, and it is judged which tendency the actual shape is in. For instance, the number $H_t$ of shape points at this moment is compared with the number $H_{t-9}$ of shape point of the tenth point in the past.

That is, as shown in Table 3, when Ht shows a larger value than $H_{t-9}$, it shows the tendency that the end portion is going to be elongated. Contrarily, when the $H_t$ shows a smaller value than $H_{t-9}$, it is judged that the actual shape is in the tendency that the end portion is going to be tightened.

TABLE 3

| Results of the comparison of the number of shape points | Tendency of shape changes |
|---|---|
| $Ht > H_{t-9}$ | The end is going to be elongated. |
| $Ht < H_{t-9}$ | The end is going to be tightened. |
| $Ht = H_{t-9}$ | Stabilized. |

Furthermore, when Ht is equal to $H_{t-9}$, it is judged that the actual shape is stabilized, and the processing bypasses the step (S45) for compensating the number of level of the actual shape classifying items described later.

Hereupon, in the case that the shape change at the time T is in the "tendency of end elongation", the actual shape classifying item at the moment is specified as "End elongation" and the number of level is 3, a compensating action to increase the number of level by 2 is taken for the number of level of the actual shape classifying items at the moment (S45) as shown in FIG. 4(b). This is because to secure the future shape control it is considered that the level 3 in the above example is not proper and actually the degree of "End elongation" is roughly equivalent to the level 5 (the condition that the end elongation is rapidly increasing) when taking the shape control and the tendency of shape change at this moment into consideration altogether.

Figure 4A:
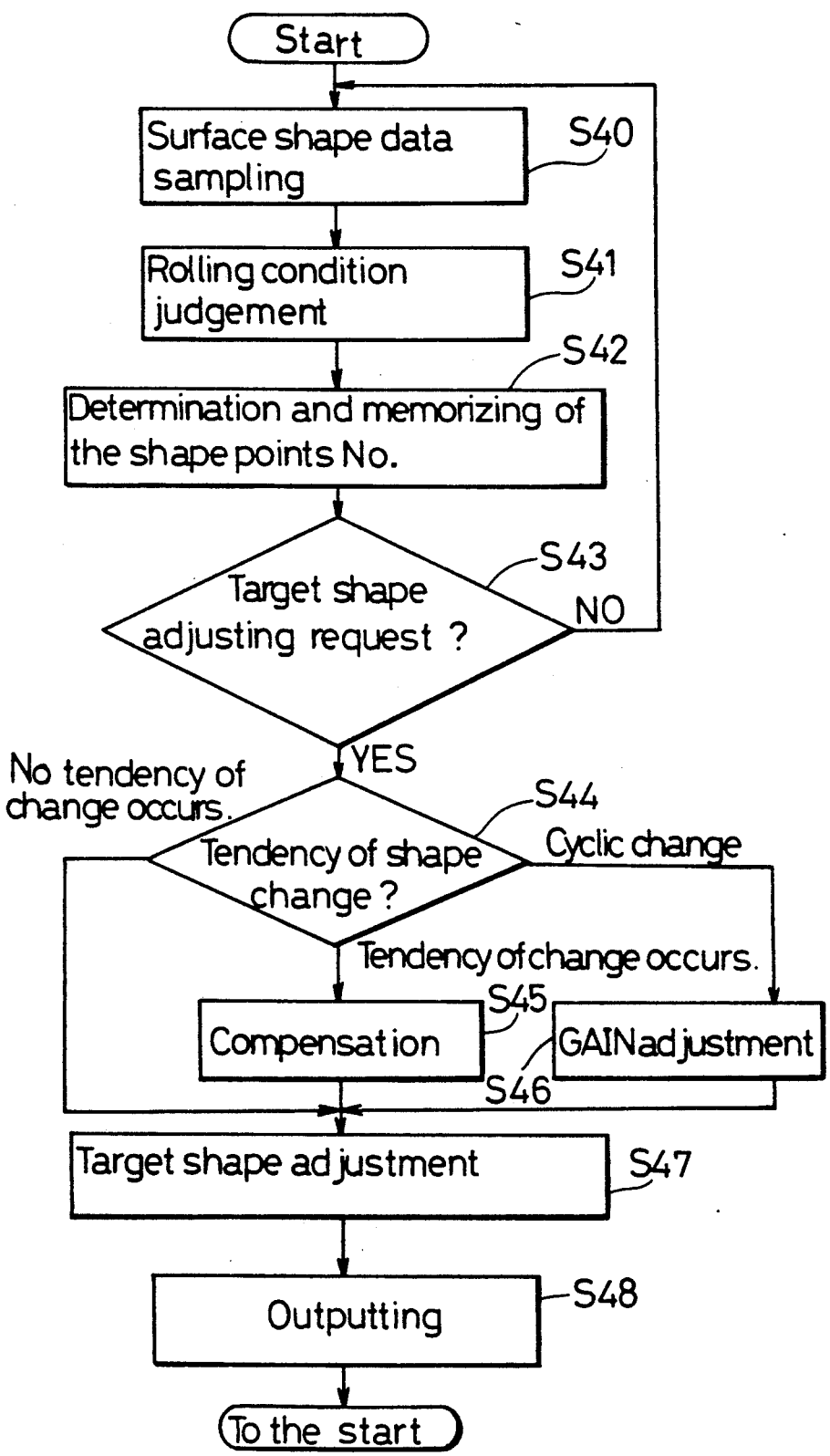
FIG. 4(a) is a flow chart showing the processing procedure for judging the tendency of changes of the actual shape data.

Therefore, in the step S47 of FIG. 4(a), the target shape data is changed and adjusted in order to secure the desired actual shape on the basis of the latest actual shape classifying items specified as shown in the above and the number of level after compensation and is outputted to the shape controlling section 3(S48).

On the other hand, in the step S44, in the case that the actual shape is in a cyclically changing tendency, the control GAIN is subtracted by 30% and given on changing and adjusting the target shape data, thereby causing the cyclically changing tendency of the actual shape to be suppressed.

On the other hand, in the case that dispersion is adopted as statistical characteristics information, it is possible to judge the rolling condition by the degree of dispersion of the actual shape data pertaining to the shape at the end portion of aluminum foil 53, for instance, to the time changes. Namely, the case that the degree of dispersion is large shows that the rolling condition is unstable. Hence, in this case, the control actions shown in the following (i) and (ii) are conducted by the above shape controlling section 3, in order to stabilize the rolling conditions. Where (i). The control GAIN of the coolant amount is changed and set to be lower.

(ii). As it is considered that the reduction rolls 52 are not sufficiently preheated, the whole coolant amount is to be decreased or the ratio of elongation of the target shape is generally to be increased.

Figure 5:
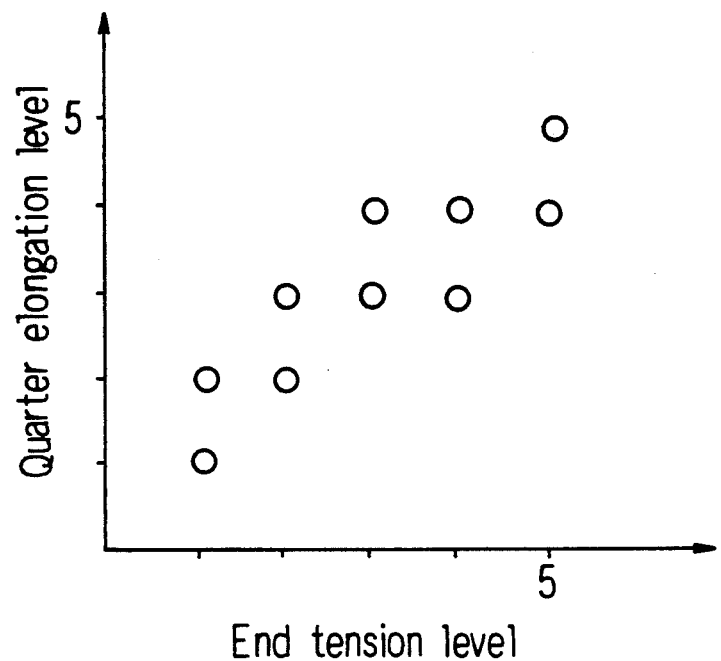
FIG. 5(a) and FIG. 5(b) are the graphs showing the correlation between the numbers of the levels of two items of classification of the actual items.
Figure 5:
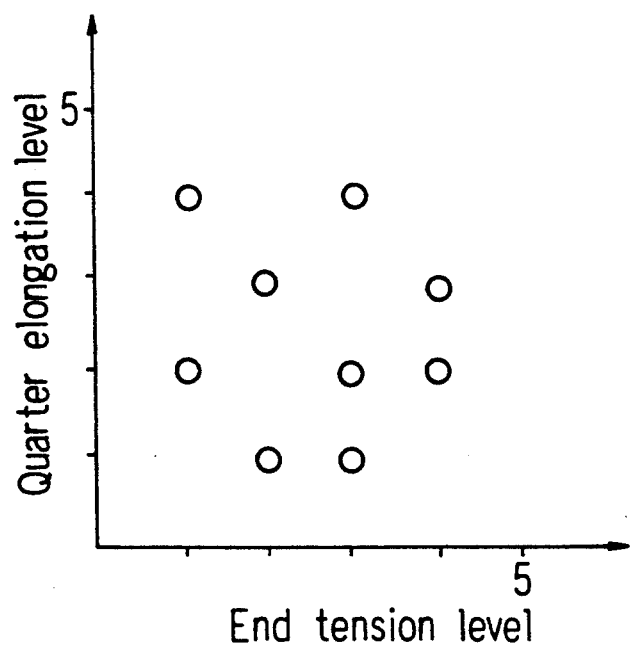

The correlation between the level of elongation of the quarter elongation and the level of "End tension" is shown in FIG. 5(a) as example that the statistical characteristics information is in the correlation. At this time, it can be said that the relationship between both the above is in a positive correlation, and it means that both the "Quarter elongation" and the "End tension" are apt to occur at the same time.

And in these cases, it has been found through the experience knowledge that such a shape adjusting method as decreasing the coolant at the end portion does not become valid in order to dissolve the "End tension". On the other hand, in the case that the relationship between both the above is not in any correlation as shown in FIG. 5(b), a knowledge that the shape adjusting method which has been taken for the positive correlation will become valid has been obtained, thereby causing the actual shape to be corrected and adjusted by the corresponding shape adjusting method.

Figure 6:
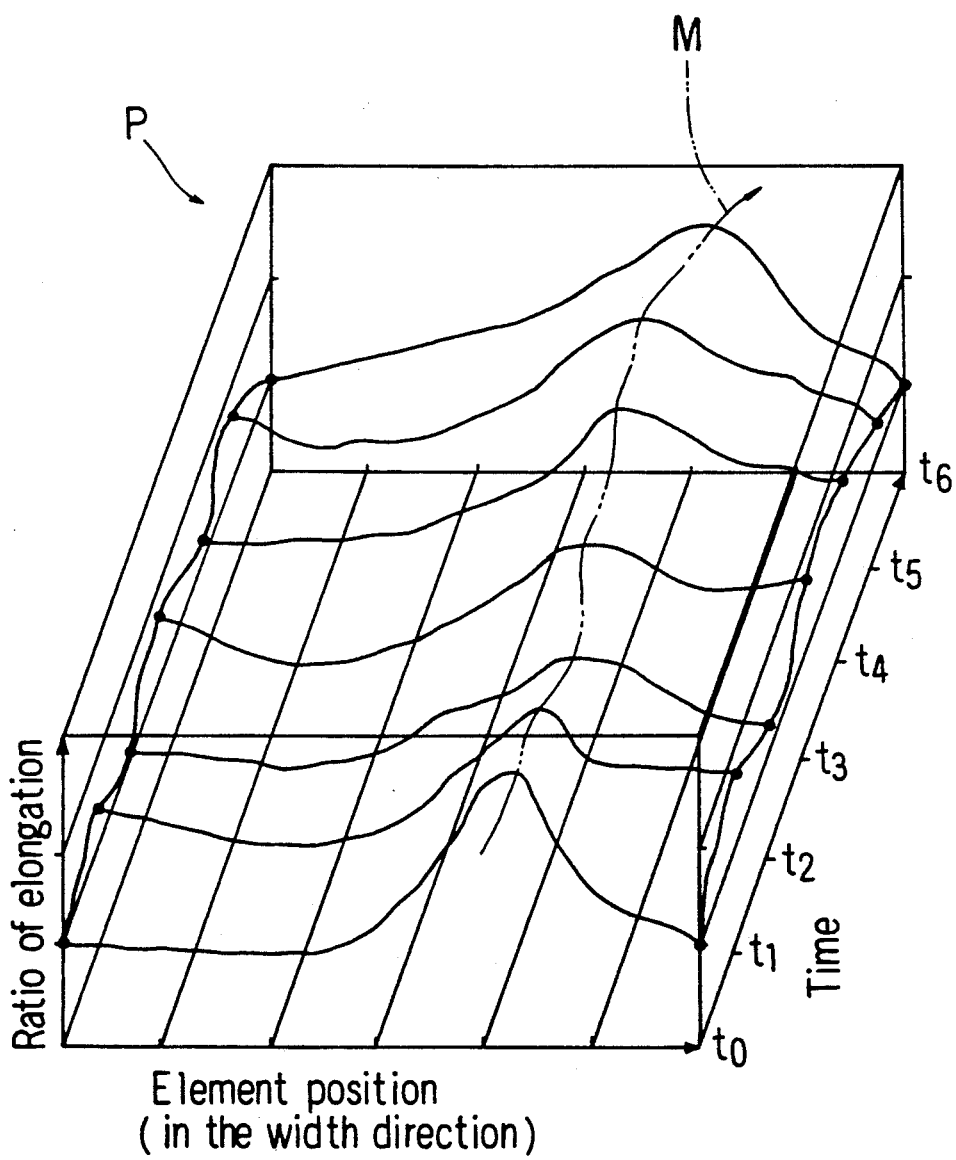
FIG. 6 is a three-dimensional graph showing the three-dimensional patterns by the time-elapsing changes of the actual shape data of aluminum foil.

Furthermore, the statistical characteristics information can be obtained through recognition of the three-dimensional pattern pertaining to the actual shape data. FIG. 6 shows the three-dimensional pattern "P". In the figure, an arrow "M" shown with the two-dashed line shows the positional transit of the elements 4e which have detected the maximum value of the ratio of elongation in the times $t_0$ through $t_6$ according to the time. As illustrated, the elements 4e which have shown the maximum value of the ratio of elongation meanders in the width of several elements 4e in the foil width direction. Under such a state, coolant 58 must be concentrated and uniformly jetted to the reduction rolls 52 corresponding to the width of several neighbored elements 4e including the elements 4e in not only the portion which is most elongated at this moment but also those before and after the corresponding portion.

This means that even though coolant 58 is jetted only to the portion which are most elongated now the elongated portion merely moves to the adjacent portions. The statistical characteristics information expressed with the three-dimensional pattern "P" and having such contents as "The portion where the actual shape is elongated meanders according to the elapse of time" can be judged by the numerical computing algorithm described before. However, a manner of recognition by the neural network by which the pattern recognition of the actual shape data of aluminum foil 53 can be executed takes an effect.

Figure 7:
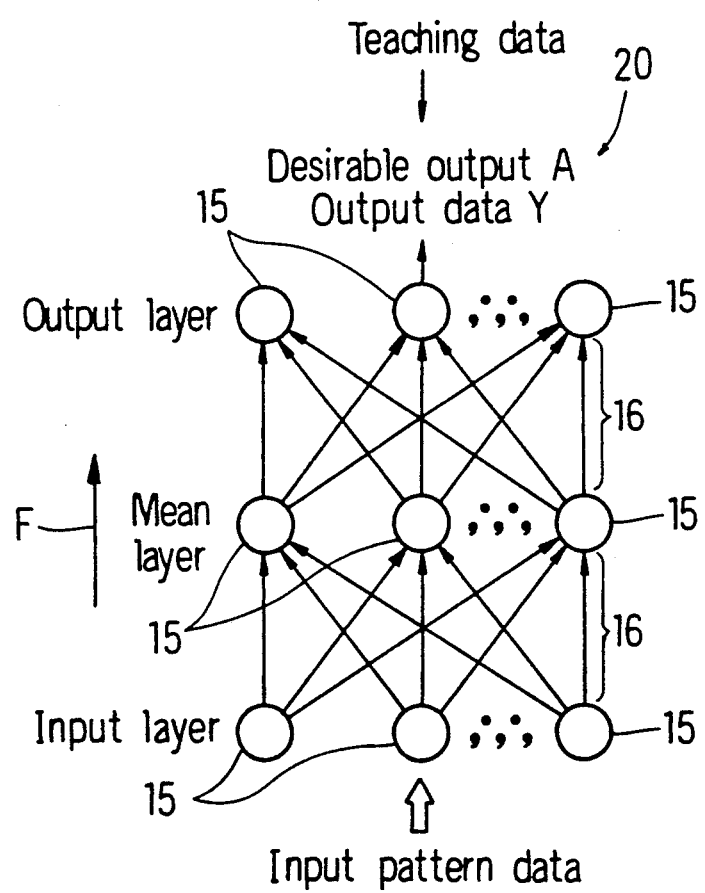
FIG. 7 is a view of model conceptionally showing the neural network.

As shown in FIG. 7, in the corresponding neural network 20, a plurality of neurons 15 which can operate and can output the input data by the threshold value processing are arranged conceptionally in the input layer, the middle layer and the output layer, all of which are mutually linked by means of connection portions 16. And the neural network 20 uses the pattern data of the actual shape data of aluminum foil 53 as input data and the actual shape classifying items and the degree thereof as output data, thereby causing the relationship of correspondence between both of the above to be learned by changing the weight of the linkage of the connection portions 16.

Hereupon, as new actual shape data is inputted in the neural network 20 which has learned in the above, the corresponding actual shape data is specified to either actual shape classifying item and the degree thereof. Such a neural network can be employed in the rolling condition analyzing section 8.

Here, the example of numerical operation by a specifying method which is determined per actual shape classifying item has been shown as manner of operation by which the actual shape condition of aluminum 53 can be judged. Needless to say, the effects of operation similar to the above description can be obtained by judgement by the neural network 20 or judgement on the basis of the rule base (not illustrated) in which the judgement knowledge is housed.

Also, the actual shape data inputted in the rolling condition analyzing section 8 from the work memory M1 for operation may be a value of one kind of data at a point of time for an appointed period of time, values of several kinds of data at a point of time, a value of one kind of data at several points of time, or values of several kinds of data at several points of time, and data necessary for the operation may be used suitably.

Thus, the rolling condition analyzing section 8 specifies the actual shape classifying items and the degree of certainty thereof in relation to the current actual shape data of aluminum foil 53 and writes them in the work memory M2.

③ Generation of the Control Target

The control target data (Shape changing target (FIG. 8) and the degree of importance thereof (Attribute)) which will be a key for properly setting and changing the target shape is inputted through a terminal computer 6 at the side of a reduction roll mill 2 by an operator 5 or can be automatically generated in compliance with the rolling condition data of the actual shape classifying items and the degree of certainty, etc. in the work memory M2.

Thus, judgement for which actual shape classifying items the actual shape data on which the current control state of the reduction roll mill 2 has been reflected reverts to, in other words, judgement for a shape changing target and the degree of importance thereof which are led out from the judgement is carried out, emphasizing on either of subjects (attributes), one of which is that an operator 5 inputs using a terminal computer, and the other of which is that the control target generating section 9 can automatically generate.

In the automatic generation, a rule of [reflecting the directions of the operation "Rolling is conducted with the end portion much elongated in a specified pass"] or of [Priority is placed in the information inputted by an operator 5 in the case that those inputted by the operator is conflicted with those which have been automatically generated] and another rule of [Priority is placed in either having a higher degree of certainty] is adopted with reference to the knowledge base D2 for setting the control target.

Therefore, even in the case that the information inputted by an operator is conflicted with those which have been automatically generated, it is possible to avoid the competition between the rules furnished with the shape changing targets, thereby causing a contradiction between the actions incidental to the corresponding rules to be dissolved.

And, for instance, in the case that the detected actual shape data includes "End elongation" as shown in the above example and the degree of certainty thereof is 0.8, "Want to tighten the end portion" is selected from the five shape changing targets in order to dissolve "End elongation", and the degree of importance corresponding to the degree of certainty (0.8) is given to the selected shape changing target. And the shape changing target and the degree of importance thereof are memorized in the work memory M3.

The situation in which the degree of importance of the shape changing target is operated for the degree of certainty of the actual shape classifying items specified in the above in the control target generating section 9 is described below;

The degree of importance is the criteria for whether or not it is necessary to change the target shape data and is expressed in the graph (FIG. 9) showing the relationship between the degree of importance of the shape changing target and the degree of certainty of the actual shape classifying items showing, for instance, the degree of "End tension" of the actual shape data. In the figure, the example of "End tension" of the actual shape classifying items is shown.

An importance degree calculating function (f(x)) to give a degree (the degree of importance) for the necessity for changing the target shapes for each of the actual shape classifying items such as "End tension" or "End elongation" is defined. For example, the importance degree calculating function f1( ) regarding "End tension" is f1 (x)=zero (0) where $\times (L_1$ and f1 $(\times)=1-e-\gamma o(\Delta-L1)$ where $L_1 \leq \times \leq 1$.
Where;

$0 \leq \times \leq 1$: Degree of "End tension" (Degree of certainty)

L1: Actual number to meet 0 ($L_1 \leq 1$
$\gamma o$: Optional positive number

Figure 9:
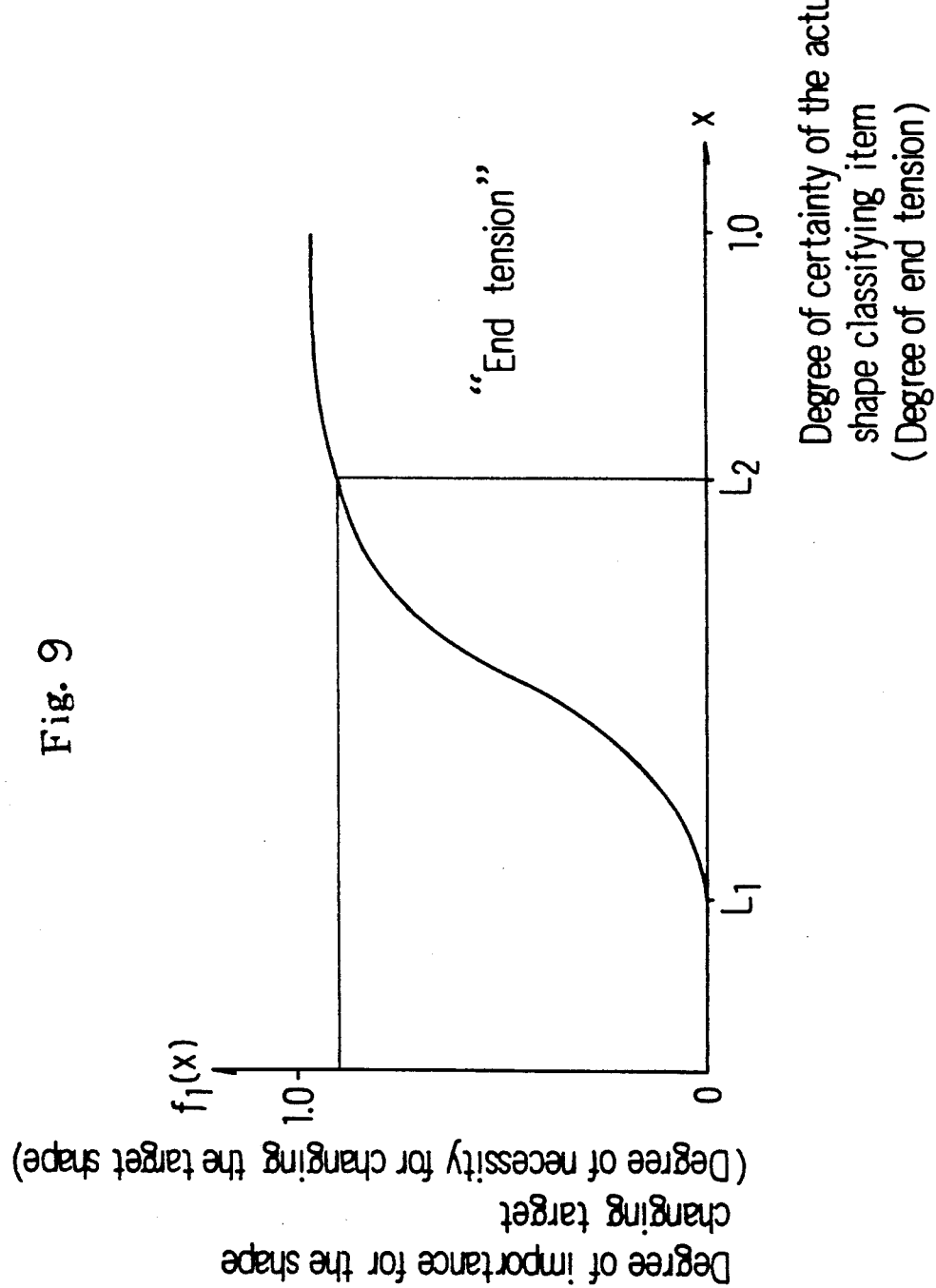
FIG. 9 is a graph showing the relationship between the degree of importance of the shape changing target and the degree of certainty when the actual shape classifying item is "tension at the end"

Namely, in the case that the degree of "End tension" (Degree of certainty) is compared with the first threshold value $L_1$ and exceeds the corresponding threshold $L_1$ as shown in FIG. 9, the actual shape classifying item is selected for changing the target shape, and the degree of importance corresponding to the degree of certainty is operated. On the other hand, if the degree of certainty is less than the first threshold value $L_1$, the degree of importance is given zero (0), the actual shape classifying item is never proposed on changing the target shape. The first threshold value $L_1$ is individually set for each of the actual shape classifying items, and respective degrees of certainty are compared with the threshold value $L_1$ and operated, thereby causing every actual shape classifying item to be judged for whether or not it is proposed for changing the target shape.

It is judged for every actual shape classifying item as shown in the above for whether or not it is necessary to change the target shape. At the same time, there may be another case that judgement is made according to whether or not the average of the component degrees of importance for every actual shape classifying item exceeds the threshold value.

Consecutively, a method for judgement on the basis of the component degrees of importance or the average thereof for whether or not it is necessary to change the target shape for the actual shape classifying items selected to change the target shape is described in details below;

Supposed that the actual shape classifying items are S1, S2, . . . , Si, the component importance degree calculating function g ( ) in which the importance degree calculating function fsi ( ) of every actual shape classifying item defined corresponding thereto is composed is defined as follows:

g(fs1 (x1), . . . , fsi (xi))

Where; For each fsi (xi) . . . Strongly monotonous increasing
g (0, . . . . . . , 0)=0
g (1, . . . . . . , 1)=1

The function g ( ) is expressed with the total sum average or in a form of the total sum as follows;
g=($\Sigma$fsi (xi))/i
or g=$\Sigma$fsi (xi)
However, $0 \leq$ fsi (xi)$\leq 1$
fsi (xi) is strongly monotonous increasing for xi.
Here, strongly monotonous increasing of $f(L_1)$ for $L_1$ means that $f(L_1) < f(L_2)$ when $L_1 < L_2$.

Thus, the component degree of importance to show the degree of necessity for starting the inference processing is operated in the action option inference section 11 in accordance with the degree of importance of each actual shape classifying item. When the component degree of importance exceeds the appointed second threshold value L3 (not illustrated), the inference processing starts, thereby causing the target shape data to be properly changed. The ensuing description shows one of the detailed examples;

In the case that the degree of importance for "End tension" is 0.4, the degree of importance for "Quarter elongation" is 0.6, and the degree of importance for others ("End elongation", "Middle elongation" and "Middle tension") is 0, the component degree of importance is 0.4+0.6+0=1.0 for the total sum. At this time, as the component degree of importance is larger than the second threshold value L3 if it is 0.9, the inference processing starts. The method using the total sum average may be employed as method for determining the degree of importance which will be a trigger.

In this embodiment, as shown in the above, also when the degree of certainty per actual shape classifying item exceeds the threshold value given respectively, for instance, the degree of "End tension" exceeds the threshold value L2 shown in FIG. 9, the inference processing starts.

Also when the component degree of importance exceeds the second threshold value L3, a starting signal may be outputted to warning means not illustrated herein at the same time, thereby causing the corresponding warning means to be started.

Next, the inference processing of the target shape is described below;

④ Application of the Action

④-(1). Rule Inference

The operation condition data including the current target shape data and the current actual shape data the rolling condition data including the extracted actual shape classifying items and the degree of certainty thereof, and the control target data including the shape changing target and the degree of importance thereof, processed as described in the above, are transferred to the action option inference section 11 from the work memories M1, M2, and M3, respectively. The action option inference section 11 verifies each of the transferred data and the condition section of rules memorized in the knowledge base D3 for the action inference, extracts the rule which can meet, through the result of verification, that all in the condition section are true and correct, and selected the target shape changing data (FIG. 8, hereinafter called "action") in the conclusion section of the rule. The inference processing to lead out the conclusion (target shape to be adopted) corresponding to such condition as the operation condition data, the rolling condition data and the control target data shown in the above must depend upon the knowledge (know-how) of an experienced operator as already described in the above. According to the invention, the inference processing is automated. The rules for the automated inference is accumulated and memorized in the knowledge base D3 for the action inference. Such rules are expressed in a pattern of [IF (condition section), THEN (Conclusion section)] and is expressed in a form of such logical product as shown below;

IF [Control target data], AND [Operation condition data, Rolling conditing data], THEN [Target shape adjusting parameters and designation of the changing degree (Action and the degree thereof)]

Here, the target shape adjusting parameters are factors for determining the target shape data (Target distribution of the ratio of elongation in a certain pass) as shown in Table 4. All the parameters shown in Table 4 are not necessarily described as target shape adjusting parameters to constitute the conclusion section of respective rules. In most cases, only a part of target shape adjusting parameters necessary to satisfy the condition section are described together with the degree thereof.

For example, as shown in FIG. 10, in the case that it is specified in the rule example 1 that the actual shape of aluminum foil 53 is of the "Quarter elongation" and that there is no zero (0) point below the most elongated portion in the vicinity of the quarter portion at that time, a rule to designate the action of content that "Bring the position of the zero (0) point to below the most elongated portion in the vicinity of the quarter portion is memorized in the knowledge base D3 for the action inference.

④-(2). Dissolving the contradiction and the redundancy

On the other hand, in some cases, there is a rule in which additional conditions are given as shown in the rule example 4 in Table 4.

For instance, when "End tension" and "Quarter elongation" occurs at the same time in a certain actual shape, there is a case that the rule examples 2 and 3 are selected. As these rules can be established at the same time, the action option inference section 11 can not dissolve such contradictions, and an error occurs. Hence, it is possible to dissolve the contradiction by providing, for instance, the condition section of the rule example 2 with an additional condition and by regarding it as the rule example 4. Namely, in the rule example 4, in

TABLE 4

| Example | Rules applicable to the inference | |
|---|---|---|
| Rule example 2 | Main condition: | Want to elongate the end portion. |
| | Conclusion: | Increase the target value of the end level (Ratio of elongation). |
| Rule example 3 | Main condition: | Want to tighten the quarter portion. |
| | Conclusion: | Must not increase the target value of the end level. |
| Rule example 4 | Main condition: | Want to elongate the end portion. |
| | Additional condition: | The degree of importance to want to tighten the quarter portion |

TABLE 4-continued

| Example | Rules applicable to the inference | |
|---|---|---|
| | Conclusion: | is smaller than 0.4. Increase the target value of the end level. | the case that although both the degree of importance to want to elongate the end portion and the degree of importance to want to tighten the quarter portion exceed the first threshold value, the degree of importance to want to tighten the quarter portion is less than 0.4, the target value of the end level (Ratio of elongation at the end portion in the width direction) is increased.

Thus, in the case that the actual shape data is specified to a plurality of the actual shape classifying items and a contradiction occurs between the actions which are led out from the the corresponding actual shape classifying items, the degree of seriousness (attribute) to show the seriousness on the control rules which are set in advance per actual shape classifying item can be utilized as means to dissolve the contradiction and to avoid the competition between the rules provided with the actions.

Aluminum foil 53 is classified according to foil width, foil thickness, material, post-treatment process, customers, etc. In various kinds of aluminum foil 53, there exists a type of aluminum foil 53 of which actual shape classifying item is never, for instance, "Middle elongation". In these cases, a remarkably larger degree of seriousness than the other actual shape classifying items is given to the actual shape classifying item of "Middle elongation". When a contradiction occurs between the actions, such an action as the priority can be placed in improving the "Middle elongation" is selected.

And in the case that more than two kinds of actual shape classifying items are specified in the actual shape data as shown in the above, it is possible to dissolve the contradiction between the actions at the standpoint on which actual shape classifying item becomes a larger problem. Namely, only the action which can be led out from the actual shape classifying item having a higher degree of certainty according to the degree of certainty (attribute) at which the actual shape data reverts to respective actual shape classifying items may be adopted.

Furthermore, it is also possible to dissolve a contradiction between the actions as shown in the above or the basis of a combination of respective attributes. For instance, only the action which can be led out from either actual shape classifying item by comparing the degree of seriousness and the degree of certainty per actual shape classifying item on the basis of the sum thereof and the product thereof may be adopted.

As another method to dissolve such a contradiction, it is also possible to place the priority in the shape target changing of a higher degree of importance.

On the other hand, there is a case that two or more kinds of shape changing targets are selected for a certain actual shape data at the same time and the actions corresponding to each of the shape changing targets are of the same contents. For instance, the actual shape classifying items (FIG. 3 (b-1 through b-4)) of the current actual shape data are specified to "End tension" and "Middle elongation" at the same time and "Increasing the end level" (FIG. 8) of the same contents are selected as actions which are led out from respective actual shape classifying item though there is more or less difference in the degree thereof. In these actions, the rules for setting the degree of actions according to the degree of certainty of the specified actual shape classifying items are stored in the knowledge base D3 for the action inference.

Hereupon, in the case that the actions of the same contents with the degree thereof different are selected at the same time, the actions are not conducted at the same time but only the action having a higher degree of the action priority (attribute) is conducted, thereby causing the redundancy pertaining to execution of the actions to be avoided. Here, on the contrary, only the action having a lower degree of the action priority may be conducted, or an action which matches the average value of the degrees of the actions can be selected or generated. And in the case that the actual shape condition of the aluminum foil 53 is slightly improved, that is, in the case that the degree of certainty of the actual shape classifying items to be improved is only lowered from 1.0 in the last time to 0.8 at this time, it is judged that the action conducted this time is effective. However, if the degree of the corresponding action, that is, the value of the target shape adjusting parameters (Table 4) were much larger, a much more effective result could be obtained. So, in order to accomplish a much more effective result, for instance, in the case that the degree (attribute) of the action is selected, the algorithm to determine the value of the corresponding degree is changed and a similar condition appears in subsequent operations, the degree of the corresponding action is greatly changed.

Namely, the value of attributes can be modified in accordance with the results of evaluation of the actions by the action effect evaluating section 10.

④-(3). Learning invalid actions

Furthermore, as shown in FIG. 8, several kinds of action options having the priority, respectively, are available for one shape changing target, and when a certain shape changing target is selected, the action having the highest priority is conducted.

The priority is not fixed but is checked per inference. For example, if inference is carried out in the action options inference section 11, which action has been employed for which shape changing target is memorized in the work memory M5, and it is judged by comparing the degree of importance of the last time with that of this time in the action effect evaluating section 10 in the next inference whether or not the shape changing target of the last time has been accomplished (i.,e evaluation of the effects).

As a result, if it is judged that the target shape data which has been changed in accordance with the shape changing target of the last time and the degree of importance thereof is effective in the action effect evaluating section 10, that is, the degree of importance is a lower value than that of the last time, the priority memorized in the knowledge base D3 for the action inference is advanced as the adopted action has been effective. Contrarily, if it is judged to be invalid, the action which has been adopted in the last time but has not been effective and the rule for inference in selecting the action are memorized in the work memory M4.

For instance, If the shape changing target "Want to elongate the end" has been determined in the last time with the degree (0.6) of importance in the shape changing target shown in FIG. 8 according to the rolling condition data from the rolling condition analyzing section 8 and the data inputted by an operator 5, "Increase the end level (The degree of priority is 1)" which has the highest priority among the actions incidental thereto is selected, such a target shape data as the end level (ratio of elongation) is increased according to the degree (0.6) of importance is outputted to the shape controlling section 3, and simultaneously the adopted target shape data, the shape changing target, the degree (0.6) of importance, the action and the priority (1) are memorized in the knowledge base D3 for the action inference. And if the shape changing target "Want to elongate the end" is selected with the degree of importance more than 0.6 when determining the shape changing target of this time, there are many cases that the end tension state of the actual shape which is a problem now has not been improved. And the last actions which were taken would not be effective. Contrarily, if "Want to elongate the end" is selected with the degree of importance less than 0.6 in this time, it is judged that the last action has been effective.

Hence, the action judged to be invalid and the rule which has inferred the action are written in the work memory M4, And even though the same shape changing target is selected in the next inference and the invalid action is selected, the invalid action will be never adopted. In this case, another action selected to be proper and having the next higher priority will be adopted and is proposed for properly changing the target shape data of this time. As a result, if it is judged that an action of the next time which is adopted to accomplish the shape changing target is effective, the priority of the corresponding action is advanced, and at the same time the priority given to the corresponding invalid action is carried down. As described above, the degrees of the priority thus changed are written in the area of the priority in the knowledge base D3 for the action inference.

Thus, even in the case that the target shape obtained by the rolling target shape adjusting equipment 1 for aluminum foil does not take an effect for the actual shape thereof and the actual shape of a defective aluminum foil 53 is continued, an action which is different from that of the last time is selected even though the shape changing target is the same as that of the last inference, thereby causing invalid rules not to be repeatedly used and causing the actual shape of aluminum foil 53 to be properly changed.

However, when the action corresponding to the average value of the degrees of a plurality of actions, of which degree of execution is different even though the content of the actions are the same as shown in the above, is adopted in order to dissolve the redundancy, there is a case that the action is not effective. In these cases, as they may be effective if the original actions before getting the average thereof are adopted, a rule by which the priority of the invalid actions are not carried down to a large degree and another rule by which the original action is tried to be taken in force are stored in the knowledge base D3 for the action inference, thereby causing the matching between a function to dissolve the redundancy and a function to learn invalid actions to be secured.

Figure 11:
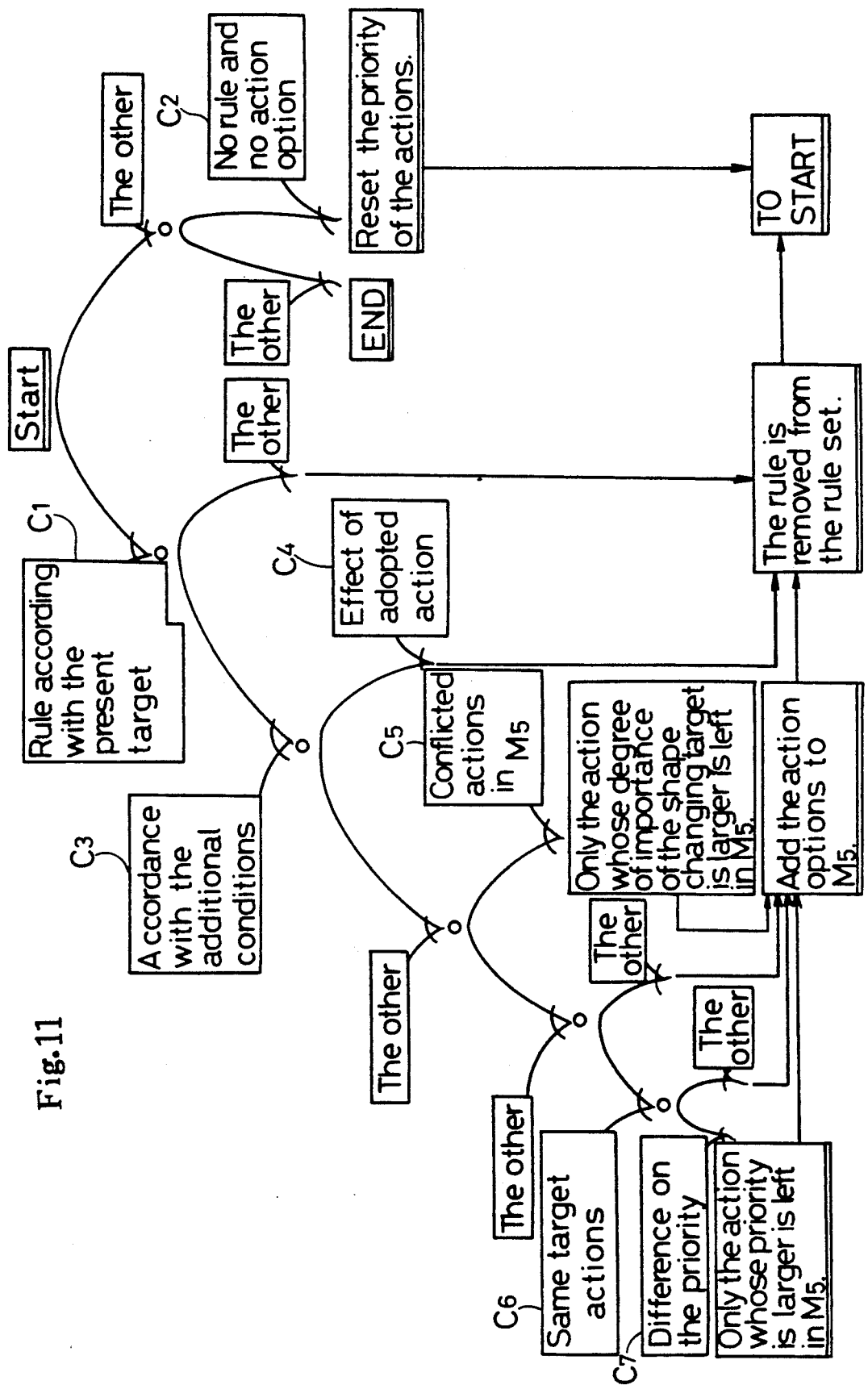
FIG. 11 is an explanatory view showing the processing procedure of a routine for checking the properness of actions to be taken, by using a checking tree.
Figure 12A:
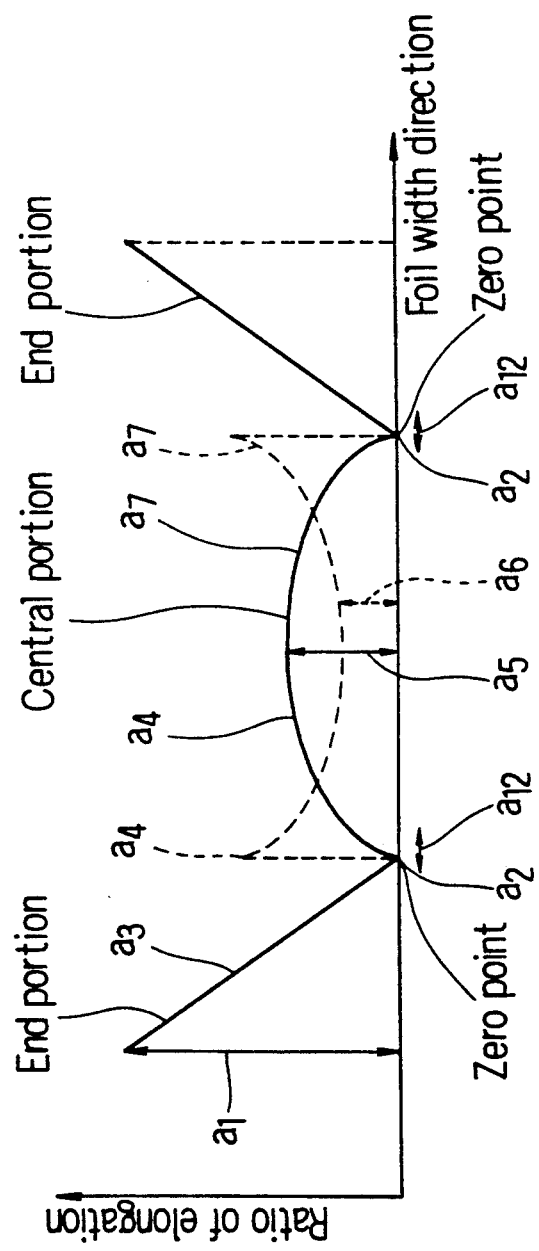
FIG. 12(a) is a still another explanatory view showing the parameters for adjusting the target shape to be used for changing the target shape.
Figure 12:
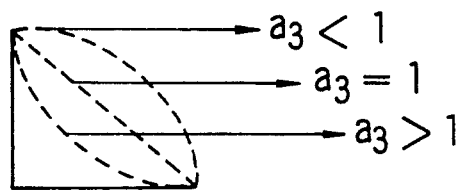
FIG. 12(b) is a diagram showing the changes of the situation of the parameter "a3"
FIG. 12(c) is a diagram showing the situation in which the central portion of the target shape to be adjusted by the above parameter "a4" is of order pattern.
FIG. 12(d) is a diagram showing the situation in which the central portion is of reversed order pattern.
Figure 12:
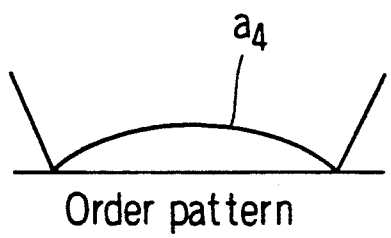
Figure 12:
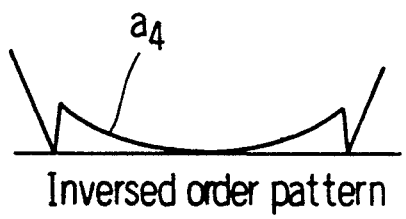

After it is carefully checked in compliance with the checking tree shown in FIG. 11 whether or not the action taken as option in the action option inference section 11 is proper and if the action is judged to be proper, it is registered in the work memory M5 at every time. Also, the rule set consisting of a plurality of rules provided with the shape shape changing target in the condition section is set per shape changing target in the knowledge base D3 for the action inference, and both the main area in which the rule set is stored and a sheltering area in which the rules eliminated from the rule set are stored are secured therein. Also, the rules by which the inference processing has been terminated are eliminated from the main area to the sheltering area one after another.

In the checking tree shown in the figure, it is checked in the case C1 whether or not a rule in which the shape changing target selected in this time is in accord with the shape changing target exists in the rule library to which the rule belongs, that is, whether or not the rule corresponding to the above rule set is left in the main area. Then, if the situation corresponds to the case C1, the additional conditions pertaining to the operation conditions, etc. which exist in the condition section of the rule is checked in the case C3.

If the situation does not correspond to the case C3, namely in the case that all the conditions section including the additional conditions are not in accord, the rule is eliminated from the rule set in the main area to the sheltering area. If the additional addition is established, it is checked in the case C4 whether or not the action of the rule in which all of the condition section area established has been adopted in the past and the effect thereof has not been recognized, that is, the action is registered in the work memory M4 at this moment. If the situation corresponds to the case C4, the rule is eliminated from the rule set (main area). If the situation does not correspond in the case C4, mutually conflicted actions are checked in the case C5. As described in the above, the shape changing target which can be set is not limited to only one, and a plurality of shape changing targets may be selected. In this case, it is not seldom that the actions incidental to respective shape changing targets are conflicted mutually.

Hereupon, if there is any action which is conflicted with the currently checked action among the actions which have already registered in the work memory M5 as being proper according to the result of checking, the action of the rule in which the degree of importance (attribute) of the currently selected shape changing target is larger in the rules furnished with either action is registered in the work memory M5, and the conflicted action which has been already registered is eliminated to the sheltering area.

Contrarily, of the degree of importance of the shape changing target furnished with the action which has been already registered is larger, the corresponding action is left in the work memory M5, and the rule furnished with the action which is now under checking is eliminated from the rule set (main area) to the sheltering area. In this checking tree, the checking is conducted as using the degree of importance as attributes as method for dissolving the contradiction as shown in the above. However, it is naturally possible to check in compliance with the other attributes (degree of seriousness, degree of certainty, subject of judgement, and degree of actions) or a combination thereof, and the method similar thereto can dissolve the redundancy. If the situation does not correspond to the case C5, namely if respective actions do not conflict with each other, it is checked in the case C6 whether or not the shape changing targets of these actions are the same. If the situation corresponds to the case C6, it is checked in the case C7 whether or not there is any difference between the degrees of priority of these actions. If there is a certain difference between them, only the action having higher priority is left in the work memory M5, and the action having lower priority is deleted in the work memory M5. If there is no difference therebetween, both of the actions are left in the work memory M5.

As described in the above, in the case that the situation does not correspond to the case C1, it is judged that any rule which is in accord with the shape changing target selected in this time does not exist in the rule set, and the processing advances to the checking in the case C2. If corresponding to the case C2 and if it is judged that all the action options are improper through checking in the case C3 through the case C7 although all the rules in respective rule sets are checked, the past invalid information in the work memory M4 are reset (cleared), and the degrees of priority are reset because a suitable action option can not be selected under the current order in the degree of priority. Subsequently, respective rule sets considering of the action options of which degree of priority has been reset are recovered, and the inference for checking the actions is repeated from the beginning.

On the other hand, as the action option which is deemed to be proper according to the results of verification of all the rules in respective rule sets is stored in the work memory M5 if not corresponding to the case C2, the inference pertaining to checking the corresponding action is terminated.

Thus, after a rule in the rule set consisting the rules commonly having a certain shape changing target is checked for the properness thereof one by one, the rule is eliminated from the above rule set (main area) one after another and is kept in a custody in the sheltering area. The checking the rules is continued until the rule set pertaining to the corresponding shape changing target becomes empty. Namely, the situation that the rule set becomes empty is the case that does not correspond to the case C1.

If two or more kinds of shape changing targets are selected, checking for the properness of the action is conducted for another shape changing target set as well as the above (From the case C1 through the case C7).

Thus, contradiction between the action options which have been already registered in the work memory M5 and the action options to be intended to be newly registered, the degree of priority thereof, the results of the effectiveness thereof, etc. are checked in the above checking routine. Thereby the properness of the action to be adopted for changing the target shape data and the matching of the rules are caused to be maintained.

⑤ Generation of a Target Shape

Subsequently, the action registered in the work memory M5 and the degree thereof, that is, such a target shape changing data as "Increase the end level, and the degree is 0.8" is transferred to the target shape generation section 12.

The target shape generating section 12 changes the values of the target shape adjusting parameters shown in Table 5 and from FIG. 12(a) through FIG. 12(d), in compliance with the target shape changing data. For instance, in the case that the above action is "Increase the end level, and the degree thereof is 0.8", the value of the target shape adjusting parameters a1 pertaining to the ratio of elongation of the end portion is changed and set in compliance with the degree of the corresponding action, thereby causing the target shape data to be changed. Furthermore, the shape control section 3 controls the coolant 58 of a reduction roll mill 2, on the basis of the target shape data which has been inputted after changing.

TABLE 5

| Target shape adjusting parameters | Description of the target shape adjusting parameters |
|---|---|
| a1 | Value of the ratio of elongation of an end portion |
| a2 | Position of the zero point |
| a3 | Inclination pattern of an end portion |
| a4 | Basic pattern of the central portion |
| a5 | Maximum value of the central portion (In the case of order pattern) |
| a6 | Minimum value of the central portion (in the case of inversed order pattern) |
| a7 | Inclination pattern of the central portion |
| a8 | Value of the ratio of elongation at the point where the target shape is intercrossed with the actual shape |
| a9 | Target shape level (Total area) |
| a10 | Proportion of the end portion (Area ratio for the total area) |
| a11 | Ratio of the central portion (Area ratio for the total area) |
| a12 | Width of the zero point |

(6) Evaluation of the Applied Actions

And the operation condition data including the actual shape data which is newly obtained in this time is inputted in the rolling data collecting section 7, and the same processing as those in the last time is repeated. Namely, the shape changing target for the actual shape of this time and the degree of importance thereof are operated in the control target generating section 9 and are compared with those of the last time in the action option inference section 11, respectively.

Figure 13:
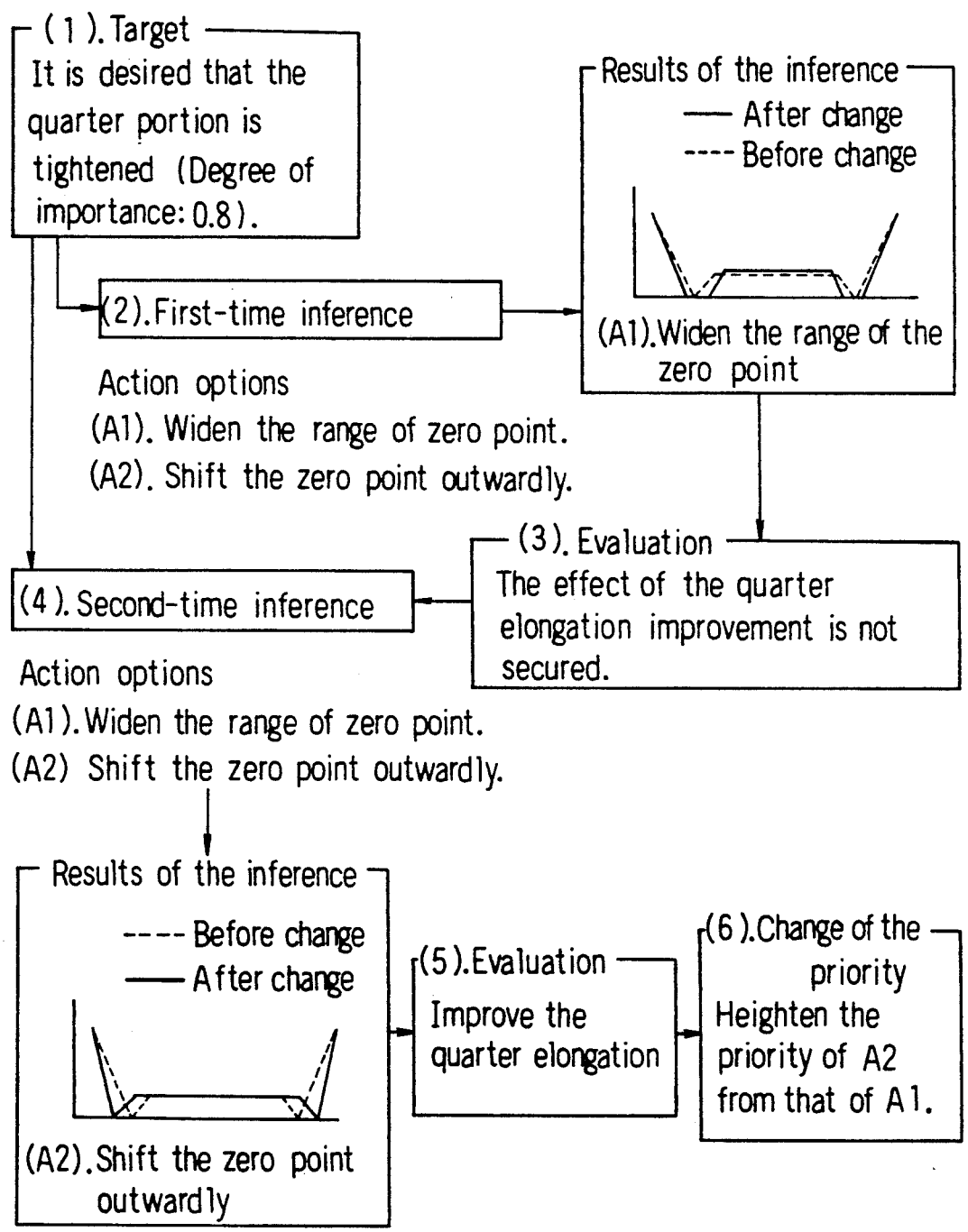
FIG. 13 is a rough view explaining the example of execution of the inference to change the target shape.

FIG. 13 shows the detailed example in which the above inference has been repeated. For instance, in the case that the shape changing target E1 operated in accordance with the actual shape data included in a certain operation condition data is "Tighten the quarter portion" and the degree of importance thereof is 0.8, the inference E2 of the first time is conducted, the action option at that time has widened the width of zero point (A1) and shifted the zero point (A2) outwardly. Here, the action (A1) having higher priority is adopted. The target shape data before and after being changed thereby was as shown in the results E3 of the inference.

However, if the effect of the action A1 was evaluated, the degree of the E1 could not become smaller than 0.8, and the effect could not be recognized. So, the rule which has led out the action A1 is stored in the work memory M4 as being invalid.

Subsequently, the action A2 having the second higher priority is adopted and the inference E4 of the second time is executed. In this case, the rule including the shape changing target E1 is subsequently adopted and the rolling process is continued. If the operation condition is not changed, in comparison with that in the inference of the first time, the above actions A1 and A2 can be obtained as option. So, as the action A1 is stored in the work memory M4 as being invalid, according to the results of verification of the history of the action effects by the inference E4 of the second time, it is not adopted (Case C4 of FIG. 11) in this time, and the action A2 having the next higher priority is adopted to change the target shape data.

Consequently, in the case that it is judged that the "Quarter elongation" has been improved, the priority of the action A2 is stepped up more than the priority of the action A1 and is memorized in the knowledge base D3 for the action inference.

Thus, the changes (shape changing targets) of the actual shapes when a certain target shape data for an actual shape of aluminum foil 53 is changed and given to the shape controlling section according to experience and the changes (actions) of the corresponding target shape data, i.e., respective experience values of the target shape data to be changed in every inference which is made in the action option inference section 11, the actual shape data which can be obtained as the result for the target shape data, operation condition data, rolling condition data or control target data, etc. which are used for setting the target shape data are memorized in the knowledge base D3 for the action inference as inference rules. And the action option inference section 11 operates proper target shape data on the basis of respective experience values, in order to realize the ideal actual shape (the direction of operations) at the moment, automatically generates the corresponding target shape data by way of the target shape generating section 12 and outputs them to the shape controlling section 3.

Figure 14:
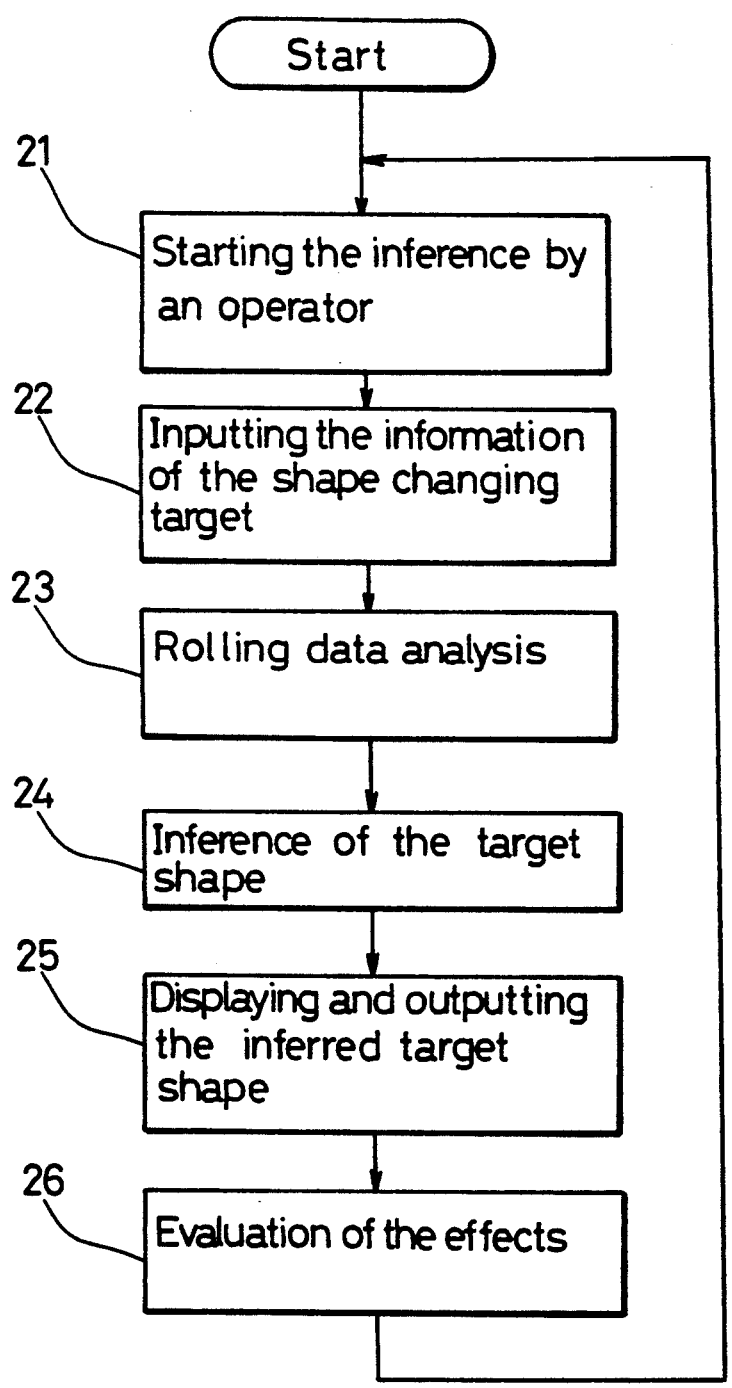
FIG. 14 is a flow chart showing the processing flow for adjusting the target shape.

The rolling target shape adjusting equipment 1 for aluminum foil so composed as shown in the above is started by pressing the keys of a terminal computer 6 at the reduction roll mill by an operator 5 as shown in FIG. 14 (Step 21). Consecutively, the operator 5 inputs the shape changing target information together with the degree of importance thereof in compliance with the input means (FIG. 15) displayed on a CRT display screen of the terminal computer 6 (Step 22).

Figure 16:
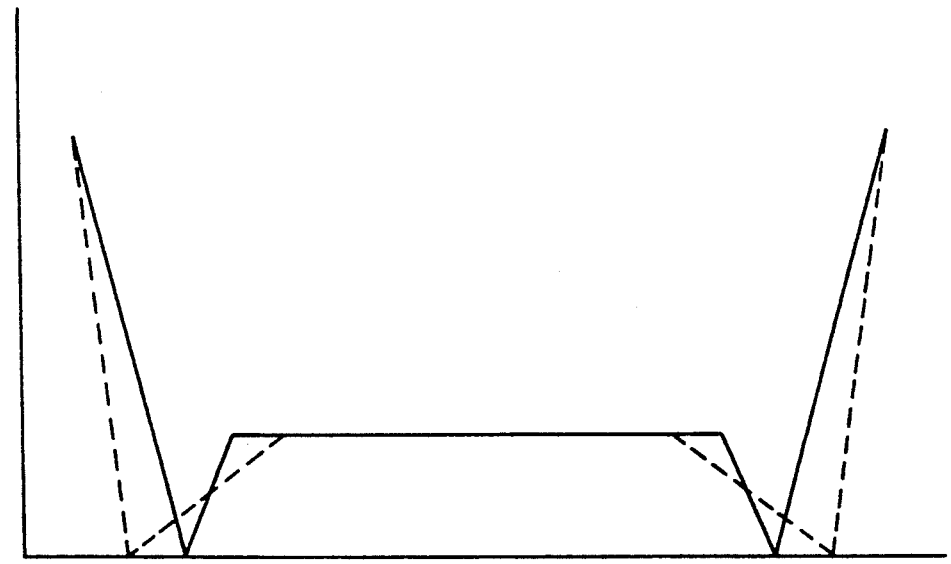
FIG. 16 is a display view showing the example of target shape displayed on the CRT display screen.

In accompanying therewith, the rolling target shape adjusting equipment 1 of aluminum foil analyzes (Step 23) the rolling data which are transferred from the shape controlling section 3, generates a proper target shape through the inference (Step 24), displays the target shapes before and after modification (FIG. 16) on the CRT display screen, and outputs the modified target shape data to a reduction roll mill 2 through the shape controlling section 3 (Step 25). And it is evaluated whether or not the modified target shape is effective for a specified actual shape having a defect (Step 26). Then, the equipment 1 enters the state of waiting for inputs by the operator 5.

At this time, the shape changing target can be automatically generated even in the target shape adjusting equipment 1. But if the automatically generated shape changing target is conflicted with that inputted by an operator 5, a shape changing target may be generated on the basis of a rule for placing the priority on either of the shape changing target of which degree of importance is higher, that inputted by an operator 5 or that according to the results of shape judgement from the actual shape classifying items.

In the case that it has been judged that it is necessary to change the target shape data as the rolling target shape adjusting equipment 1 for aluminum foil monitors the actual shape of aluminum foil 53 at all times, the inference is started by an operator 5. However, the inference for changing the target shape data can be automatically started. For instance, the comparison conditions between the degree of certainty of the actual shape classifying items and a certain threshold value α are set in the condition section of the rule. The detailed example of the rule is shown below:

IF [Actual shape classifying item and the degree of certainty thereof], AND [Operation conditions],
THEN [Designation of the shape changing target and the degree thereof] Further in details,
The rule of IF [the degree of certainty of the "End elongation" <α], AND [the pass is the second pass],
THEN ["Want to elongate the end portion" and the degree of importance with 1.0] is expressed.

Namely, when the actual shape changes and the degree of elongation at the end portion becomes less than the threshold value α, the above rule is applied, thereby causing the inference to be started.

Figure 17:
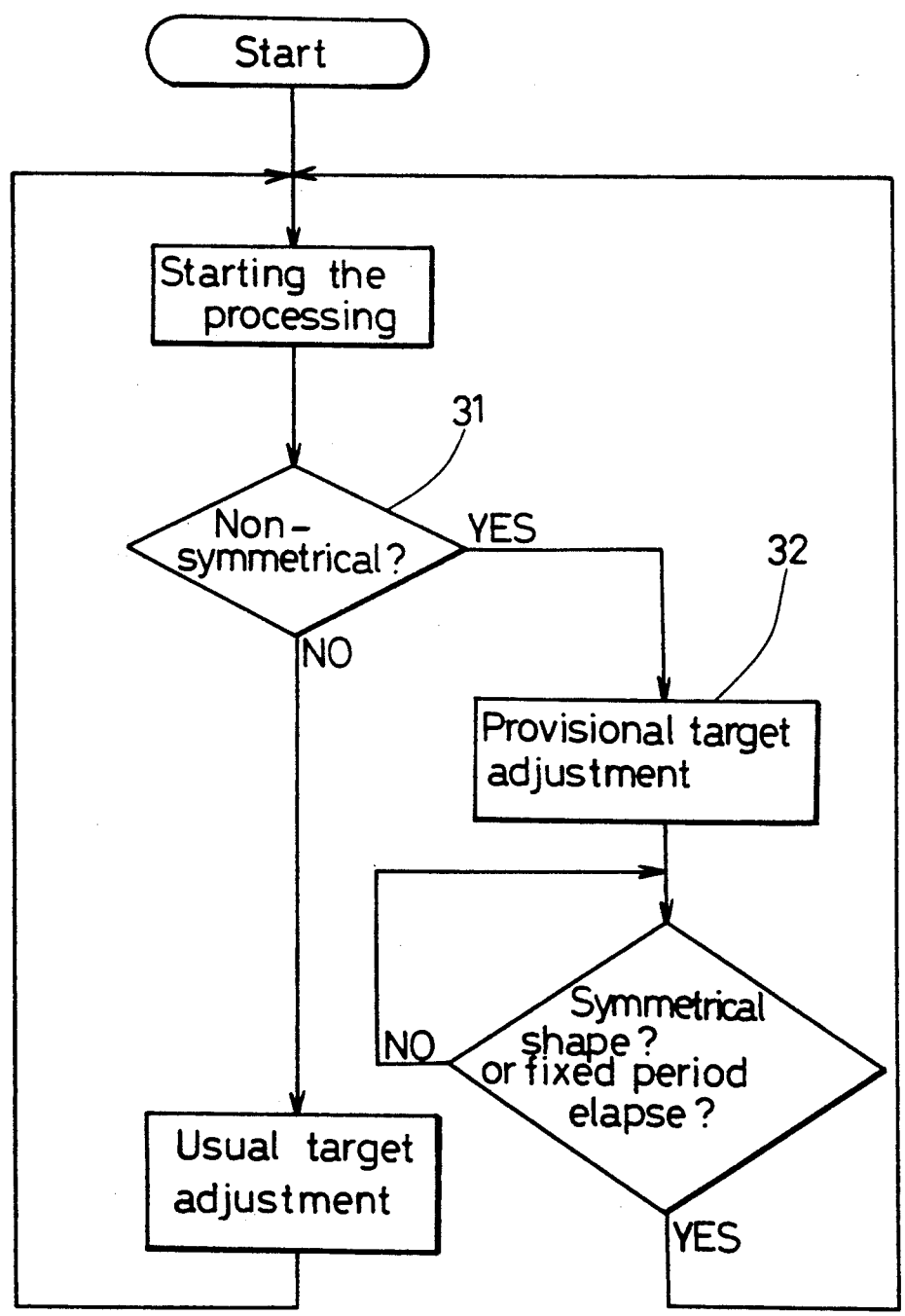
FIG. 17 is a flow sheet showing the method for correcting the actual shape obtained non-symmetrically.
Figure 18:
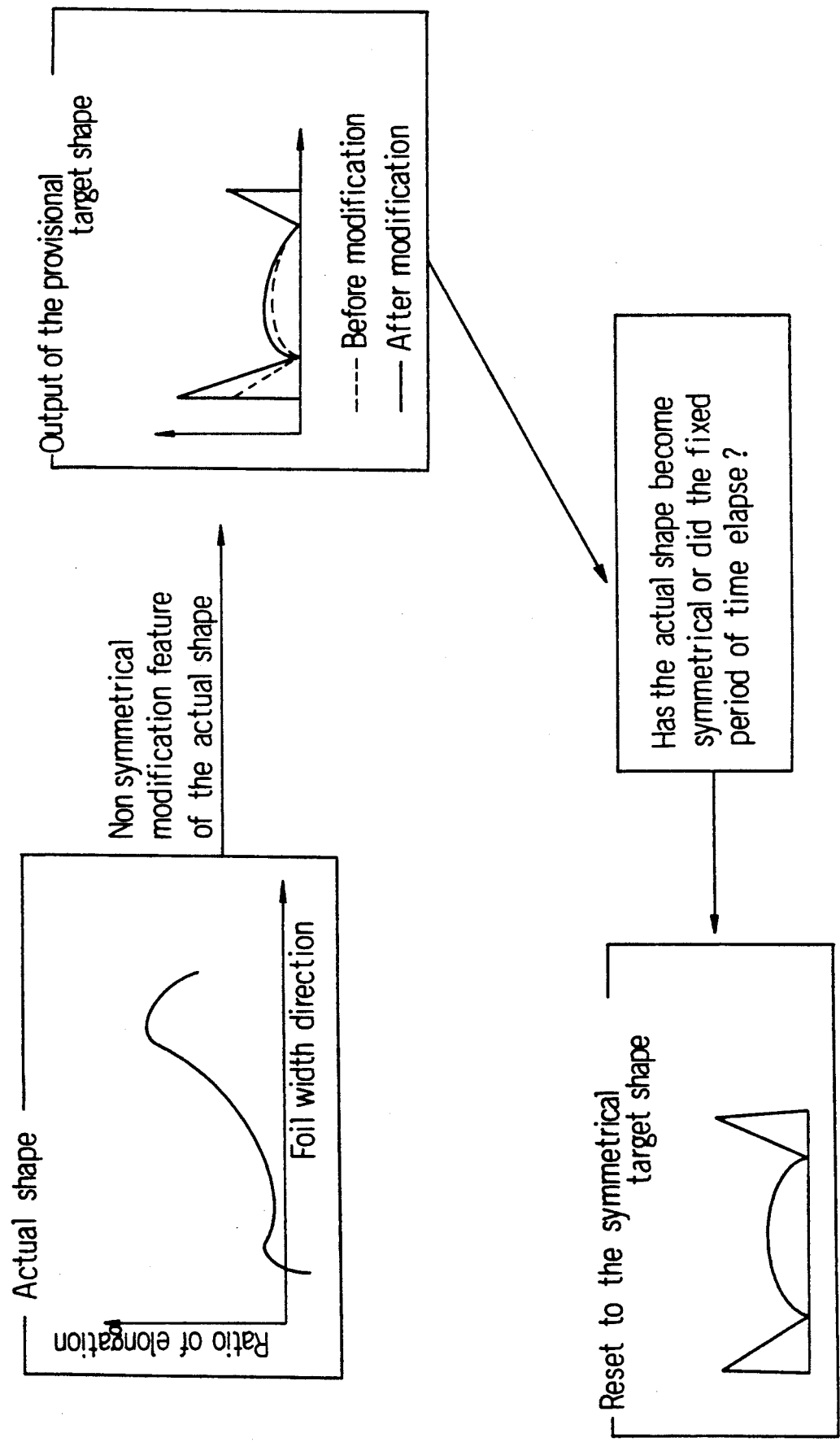
FIG. 18 is a rough view explaining the situation of correcting the non-symmetrical actual shape.

Furthermore, the rolling target shape adjusting equipment 1 for aluminum foil is provided with such a function that it can improve the non-symmetry when the obtained actual shape data is non-symmetrical in the width direction. As shown in FIG. 17 and FIG. 18, in the case that it is judged that the actual shape data is non-symmetrical (Step 31), the target shape which was symmetrical just before for the portion where the ratio of elongation is low is set to be provisionally higher by an operator 5 (Step 32). This is because the distribution of the jetting amount of the coolant 58 to be jetted to the reduction rolls 52 is leaned to in the foil width direction temporarily, thereby causing the heat distribution on the reduction rolls 52 to be made uniform. Especially, this is effective when starting the operation (while the temperature of the rolls is rising) or when re-starting the operation (after replacement of the rolls). The processing in the step 32 is repeated until the actual shape data becomes symmetrical.

As shown in the above, according to the equipment of this embodiment, even in the case that the operation condition of a reduction roll mill 2 is minutely changed, it is possible to automatically and properly set and change the target shape data to control the reduction roll mill 2 according to the minute changes.

Thereby, it is possible to produce aluminum foil 53 of an optional target shape, which is determined on the direction of the operations, under a stabilized condition without depending upon experiences and skills on the operation.

Moreover, it is also possible to increase the rolling speed by virtue of promoting of the controllability on the basis of shape stabilization of aluminum foil 53 as shown in the above.

Also, the rolling target shape adjusting equipment 1 for aluminum foil is provided, as sensor for detecting the actual shape data for elongation and tension at the time of rolling, with elements 4e including piezoelectric elements. However, a plurality of air bearing type elements which are of almost the same appearance as that of the elements 4e may be used instead, and it is possible to detect the actual shape data on the basis of changes of the pneumatic pressure thereof.

In this embodiment, though the object to be controlled is aluminum foil 53, it is not limited to aluminum foil. It may be copper foil or other metal, regardless of the thickness thereof.

Figure 19:
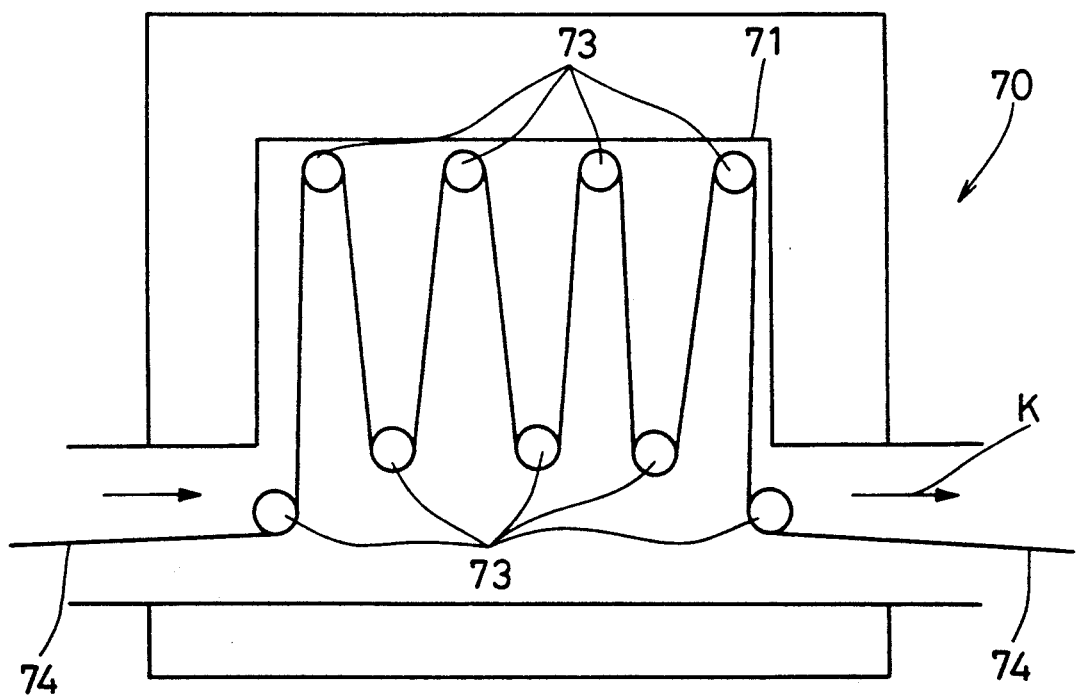
FIG. 19 is a compositional view showing a continuous annealing facility adopted as another example of the invention.

Namely, another example of a process to which a target shape adjusting equipment for adjusting the shape of band-like or plate-like metal materials which is running is applied is a continuous annealing plant 70 in steel making works, which is shown in FIG. 19. In such a continuous annealing plant 70, a band-like coil material 74 runs between the rolls 73 arranged in a furnace 71, the quality thereof is adjusted by being annealed at an appointed temperature, and is delivered in the direction of an arrow "k".

The coil material 74 in the furnace 71 may meander or leads to a wrinkle-like drawing where elongated unless the coil material 74 is flat and even. So, the continuous annealing plant is so composed that it can detect the shape of the running coil material 74, for instance, the distribution of the ratio of elongation in the width direction and can adjust such travelling conditions as speed, tension, etc. of the coil material 74 in compliance with the corresponding detected values.

Figure 20B:
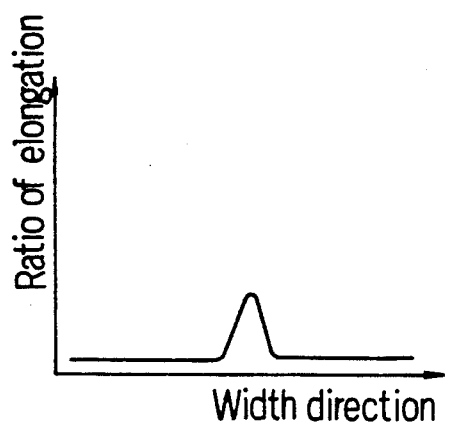
FIG. 20(a), 20(b), 21(a) and 21(b) are graphs showing the actual shape in the width direction of a coil material running in the continuous annealing facility of FIG. 19.
Figure 20A:
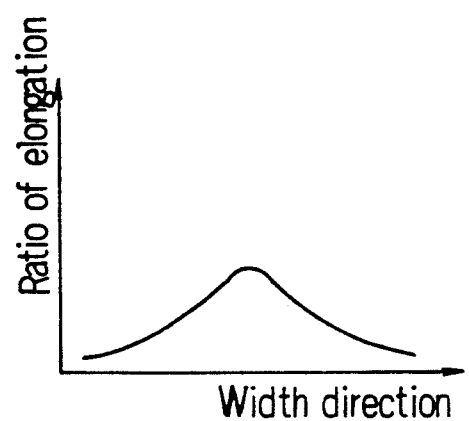
Figure 21B:
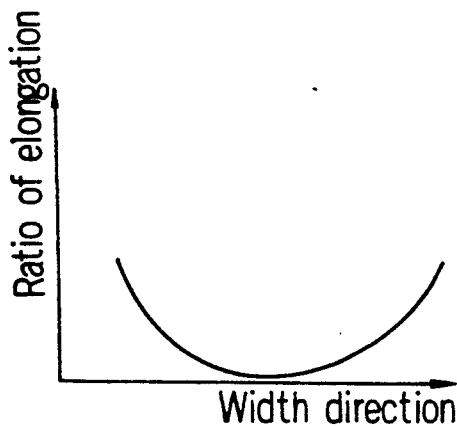
Figure 21A:
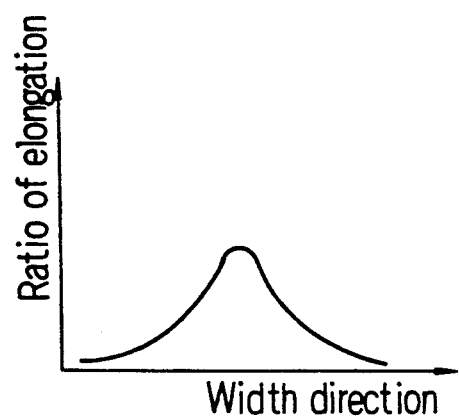
Figure 22:
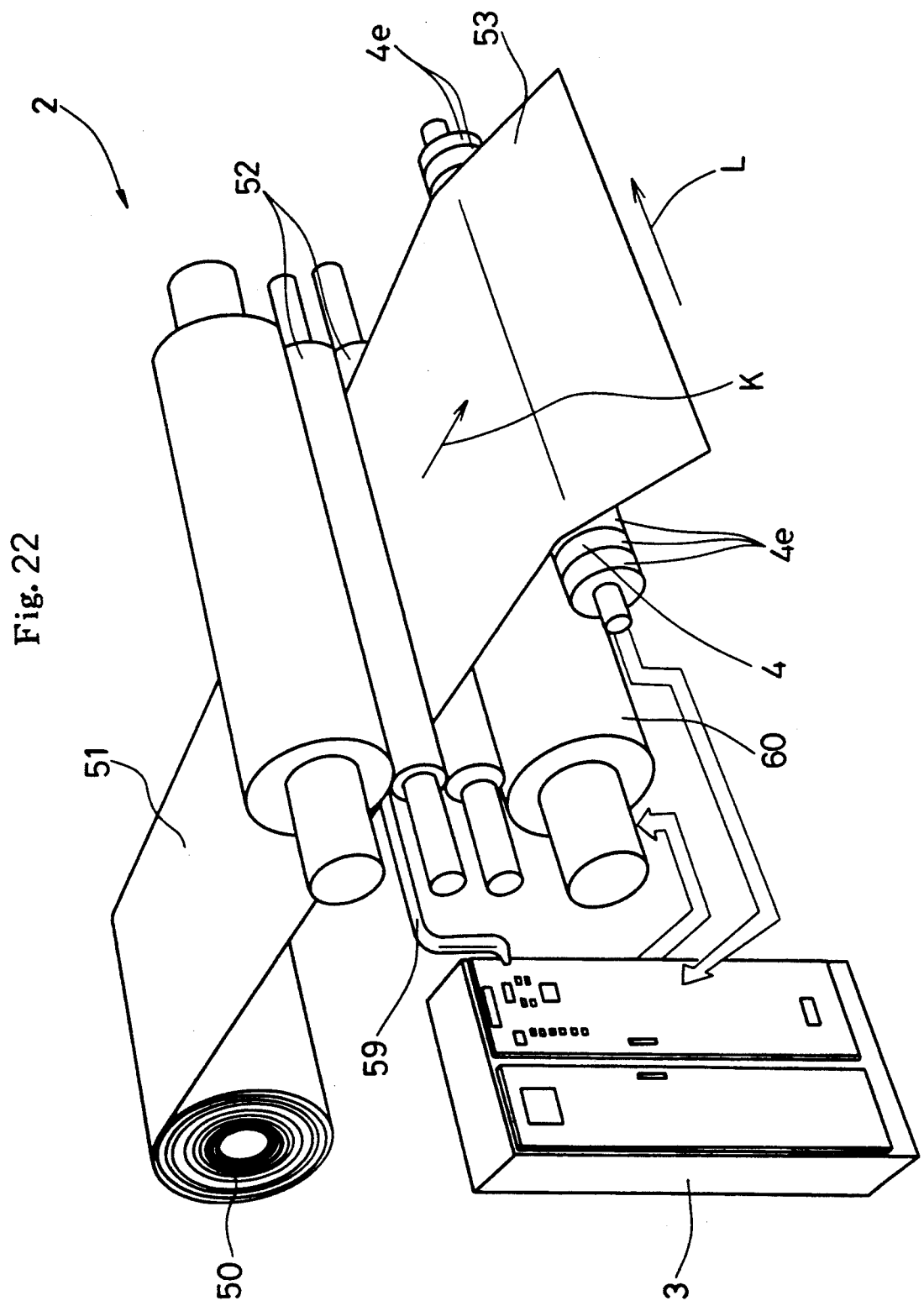
FIG. 22 is a perspective view showing a reduction roll mill which is one of the examples of the background of the invention.

And in the continuous annealing plant 70, the detected distribution of the ratio of elongation (surface shape) in the width direction of the coil material 74 is shown, for instance, as in FIG. 20(a) and FIG. 20(b). In these cases, the maximum ratio of elongation of the coil material 74 having the surface shape shown in FIG. 20(a) is larger than that shown in FIG. 20(b). However, the change of the coil material 74 shown in FIG. 20(a) in the width direction thereof is generally smooth, the above drawing seldom occurs. To the contrary, the coil material shown in FIG. 20(b) is apt to produce drawing although the maximum ratio of elongation is small. And the coil material 74 shown in FIG. 21(a) is elongated at the central portion thereof in the width direction and that shown in FIG. 21 (b) is elongated at the end portion thereof. At this time, as it is usual that the coil material 74 has an elongated central portion, so-called "Middle elongation", is apt more to produce drawing than the coil material having an elongated end portion, the former coil material 74 must be adjusted for the tension.

Hereupon, if the target shape adjusting equipment is used as pointed out in the above description, it is needless to say that the same effects as those obtained in the rolling of aluminum foil can be accomplished.

It will be apparent that many other modifications and variations could be effected by one skilled in the art without departing from the spirit and scope of the novel concept of the invention. Therefore, though the above embodiments are a preferred example, the invention is not limited to the above embodiments.

It can be understood that any modifications and variations which can be produced within the inventive scope shown in the claims described hereinafter and the scope meant by the claims thereof are all included in the claims attached hereto.

What is claimed is:

1. A target shape adjusting apparatus for adjusting the shape in the width direction of a moving band-like or plate-like metal material, said apparatus comprising:
   a shape controlling section for controlling an actual shape of the metal material in the width direction thereof, said shape controlling section being responsive to target shape data supplied thereto, said shape controlling section including means for selectively cooling a portion of said metal material;
   a sensor for detecting actual shape data representing said actual shape;
   experience value memorizing means for memorizing experience values, said experience values representing changes of the actual shape corresponding to previous changes of the target shape data; and
   operating means for preparing the target shape data on the basis of the actual shape data and the experience values, said operating means being adapted to output the target shape data to the shape controlling section.

2. A target shape adjusting apparatus for adjusting the shape in the width direction of a moving band-like or plate-like metal material, said apparatus comprising:
   a shape controlling section for controlling an actual shape of the metal material in the width direction, said shape controlling section being responsive to target shape data supplied thereto;
   a sensor for detecting actual shape data representing the elongation and tension of the actual shape of the material;
   data collecting means for collecting and memorizing the actual shape data;
   condition analyzing means for judging and memorizing a present condition of the metal material based on the actual shape data from the data collecting means;
   target generating means for determining and memorizing a control target by comparing the judgment of the present condition made by the condition analyzing means with a judgment which is externally inputted;
   change knowledge memorizing means for memorizing as a pair knowledge data representing a change of the actual shape and a given change in target shape data;
   change knowledge evaluating means for evaluating and memorizing the effectiveness of knowledge data which has been utilized in the past;
   knowledge selecting means for selecting an optimal knowledge for changing the target shape through inference from the change knowledge memorizing means on the basis of results of evaluation of the knowledge data; and
   target shape generating means for preparing target shape data on the basis of the optimal knowledge for changing the target shape, said target shape generating means being adapted to output the target shape data to the shape controlling section.

3. A shape detecting apparatus for detecting a shape in the width direction of a band-like or plate-like metal material which is running, said shape detecting apparatus comprising:
   a sensor for detecting actual shape data representing an actual shape of the running metal material, and
   an operating means for classifying the actual shape into one or more shape classifying items and for determining and storing a degree of certainty of proper classification representing the degree to which the actual shape data detected by the sensor matches classification criteria for each of said one or more classification items.

4. A metal material rolling shape detecting apparatus for detecting the shape in the width direction of a band-like metal material rolled by a reduction roll mill, said apparatus comprising:
   a sensor for detecting actual shape data representing an actual shape of the metal material after rolling, and
   an operating means for classifying the actual shape into one or more shape classifying items and for determining and storing a degree of certainty of proper classification representing the degree to which the actual shape data detected by the sensor matches classification criteria for each of said one or more shape classifying items.

5. A metal material rolling shape adjusting apparatus for adjusting the shape in the width direction of a band-like metal material rolled by a reduction roll mill, said apparatus comprising:
   a shape controlling section for controlling an actual shape of the material in response to target shape data provided thereto, said shape controlling section including means for cooling a portion of said metal material;
   a sensor for detecting actual shape data representing the actual shape of the rolled metal material,
   sampling means for periodically sampling and storing the actual shape data;
   shape changing tendency operating means for operating a changing tendency of the actual shape in an appointed period of time in accordance with the actual shape data; and
   a shape adjusting means for determining latest target shape data and control gains on the basis of the changing tendency and the latest actual shape information and adjusting the shape of the rolled metal material according thereto.

6. A metal material rolling shape adjusting apparatus for adjusting the shape in he width direction of a band-like or plate-like material rolled by a reduction roll mill, said apparatus comprising:
   a shape controlling section which can control the shape of the rolled metal material in response to target shape data provided thereto, said shape controlling section including means for cooling a portion of said metal material;
   a sensor for detecting actual shape data representing an actual shape of the rolled metal material;
   a sampling means for periodically sampling and storing the actual shape data;
   statistical characteristics information operating means for processing said actual shape data stored during an appointed period of time to obtain statistical characteristics information of the shape; and
   a shape adjusting means for determining latest target shape data and control gains on the basis of the statistical characteristics information and the latest actual shape information and adjusting the shape of the rolled metal material according thereto.

7. A system drive apparatus for driving a control system of an appointed plant, said system comprising:
   a group of sensors for detecting plant data pertaining to one or more kinds of plant conditions;
   memorizing means for storing the plant data;
   certainty degree operating means for expressing a degree of certainty in accordance with the plant data, said degree of certainty representing, per plant condition, the degree of certainty that the plant will revert to the plant condition;
   importance degree operating means for comparing the degree of certainty for each of the plant conditions with a first threshold value per plant condition, selecting a plant condition having a degree of certainty that exceeds the first threshold value, and expressing a degree of importance representing the degree of necessity to change the corresponding plant condition; and
   control means for deriving a component degree of importance from each degree of importance and driving the control system when the component degree of importance exceeds an appointed threshold value.

8. A metal material target rolling shape adjusting apparatus which can operate target shape data in accordance with actual shape data representing an actual shape of a metal material and which can automatically adjust the actual shape of the metal material through a treatment of the metal material according to the corresponding target shape data, said apparatus comprising:
- a certainty degree operating means for expressing a degree of certainty, said degree of certainty representing the degree to which the actual shape data reverts to each of a plurality of actual shape classifying items, per actual shape classifying item, said actual shape classifying items classifying the shape of the metal material in accordance with the actual shape data;
- an importance degree operating means for comparing the degree of certainty per item of each actual shape classification with a threshold value per item, selecting an actual shape classifying item for which the degree of certainty can exceed the threshold value, and expressing a degree of importance, said degree of importance representing a degree of necessity to change the item; and
- a control means for operating a component degree of importance from each of the above degrees of importance and starting the treatment of the metal material target shape adjusting equipment when the component degree of importance exceeds an other threshold value.

9. A system drive apparatus for driving a control system for an appointed plant, said apparatus comprising:
- a group of sensors for detecting plant data pertaining to more than one kind of plant conditions;
- memorizing means for storing the plant data, plant condition classifying means for classifying in accordance with the plant data a plurality of feature patterns of the plant conditions;
- pattern memorizing means for storing the feature patterns of the plant conditions;
- a certainty degree operating means for operating in accordance with the plant data a degree of certainty representing a degree at which a plant reverts to the feature patterns, per feature pattern of the plant conditions;
- an importance degree operating means for comparing the degree of certainty per feature pattern of the plant conditions with a threshold value per feature pattern, selecting the feature pattern of the plant condition of which the degree of certainty can exceed the threshold value and operating a degree of importance showing a degree of necessity to change the corresponding feature pattern; and
- a control means for operating a component degree of importance from each of the above degrees of importance and driving the control system when the component degree of importance exceeds an other threshold value.

10. A system drive apparatus for driving a control system for an appointed plant, said apparatus comprising:
- a group of sensors for detecting plant data pertaining to more than one kind of plant conditions;
- a sampling means for periodically sampling and storing the plant data;
- characteristics information operating means for operating characteristics information of the plant condition in an appointed period of time in accordance with the plant data;
- a certainty degree operating means for operating a degree of certainty showing a degree at which a plant reverts to a plant condition, according to the characteristics information of the plant conditions per plant condition;
- an importance degree operating means for comparing the degree of certainty per plant condition with a threshold value per plant condition, selecting the plant condition at which the degree of certainty can exceed the threshold value, and operating a degree of importance showing a degree of necessity to change the plant conditions; and
- control means for operating a component degree of importance from each of the degrees of importance and driving the control system when the component degree of importance exceeds an other threshold value.

11. An action determining apparatus which, in order to control a system that can revert to one or more kinds of appointed conditions, can select an inference rule furnished with actions corresponding to a respective condition, judge to which condition or conditions the system reverts, select actions corresponding to the judged condition, and determine the proper action among the selected actions, said apparatus comprising:
- attribute selecting means for selecting at least one kind of attribute among those set forth in a) through e) below:
  - a) attribute showing a degree of seriousness of a control rule preset for a given condition;
  - b) attribute showing a degree at which the system can revert to a given condition;
  - c) attribute showing a subject which judges to which condition or conditions the system reverts;
  - d) attribute showing a degree of an action corresponding to a given condition;
  - e) attribute showing a degree of necessity to change a given condition;
- action determining means for determining an action to be executed from the actions corresponding to the judged condition on the basis of the attributes set forth in a) through e) above; and
- action effect evaluating means for evaluating effects of a corresponding action for the appointed conditions according to changes of the conditions before and after executing a determined action.

12. An action determining apparatus which, in order to control a system that can revert to one kind or two or more kinds of appointed conditions, can select an inference rule furnished with respective actions corresponding to the appointed conditions, judge to which one or two or more kinds of the conditions the system reverts, and determine an action corresponding to the condition judged according to a priority given to the corresponding action, said apparatus comprising:
- action effect evaluating means for evaluating effects of a corresponding action for the appointed conditions according to changes of the conditions before and after executing a determined action, and
- priority changing means for changing the priority on the basis of the effect of evaluation made by the action effect evaluating means.

13. An action determining apparatus which, in order to control a system that can revert to two or more kinds of appointed conditions, can select an inference rule furnished with actions corresponding to a respective condition, judge to which condition or conditions the system reverts, select actions corresponding to the judged condition on the basis of a priority given to the actions, and determine a proper action among the selected actions, said apparatus comprising:

attribute selecting means for selecting at least one kind of attribute among those set forth in a) through e) below:
- a) attribute showing a degree of seriousness of a control rule preset for a given condition;
- b) attribute showing a degree at which the system can revert to a given condition;
- c) attribute showing a subject which judges to which condition or conditions the system reverts;
- d) attribute showing a degree of an action corresponding to a given condition;
- e) attribute showing a degree of necessity to change a given condition; and an action determining means for determining an action to be executed from actions selected on the basis of the attributes selected from the attributes a) through e), action effect evaluating means for evaluating the effects of corresponding actions for the above conditions according to changes of the condition before and after executing the action determined by the action determining apparatus; and priority changing means for changing the priority of the actions on the basis of the effect of evaluation made by the action effect evaluating means.

* * * * *